(12) United States Patent
Torres-Jara et al.

(10) Patent No.: US 8,733,099 B2
(45) Date of Patent: May 27, 2014

(54) FLEXIBLE ACTUATOR BASED ON SHAPE MEMORY ALLOY SHEET

(75) Inventors: Eduardo R. Torres-Jara, Cambridge, MA (US); Daniela Rus, Weston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 679 days.

(21) Appl. No.: 12/896,184

(22) Filed: Oct. 1, 2010

(65) Prior Publication Data

US 2011/0173970 A1     Jul. 21, 2011

Related U.S. Application Data

(60) Provisional application No. 61/248,838, filed on Oct. 5, 2009.

(51) Int. Cl.
    *F01B 29/10* (2006.01)
    *F02G 1/04* (2006.01)

(52) U.S. Cl.
    USPC .............................................. 60/528; 60/527

(58) Field of Classification Search
    USPC ................................................... 60/527–529
    See application file for complete search history.

(56) References Cited

U.S. PATENT DOCUMENTS

| | | | | |
|---|---|---|---|---|
| 3,816,774 | A * | 6/1974 | Ohnuki et al. | 310/332 |
| 4,236,377 | A * | 12/1980 | Weinert | 60/641.13 |
| 4,938,026 | A * | 7/1990 | Goldstein | 60/527 |
| 5,035,530 | A * | 7/1991 | Fukuda et al. | 403/404 |
| 5,335,498 | A * | 8/1994 | Komatsu et al. | 60/528 |

(Continued)

FOREIGN PATENT DOCUMENTS

WO     WO 99/60267     11/1999

OTHER PUBLICATIONS

Asua, E., et al., "Micropositioning Control of Smart Shape-Memory Alloy-Based Actuators," *Assembly Automation*, 29(3): 272-278 (2009).

(Continued)

*Primary Examiner* — Christopher Jetton
(74) *Attorney, Agent, or Firm* — Hamilton, Brook, Smith & Reynolds, P.C.

(57) ABSTRACT

A flexible unit-cell actuator includes a shape memory alloy sheet having a fold between adjacent legs in one state and a heat source that upon activation concentrates heating of the shape memory alloy sheet at the fold relative to the legs to change the fold between one state and another state. The heat source may include resistive heating due to an electric current passing through the shape memory alloy sheet. The fold typically includes a reduced cross-sectional area and may include slits to increase electrical resistance at the fold relative to the adjacent legs. An actuator array includes a plurality of flexible unit-cell actuators formed in a sheet, each unit-cell actuator mechanically coupled to at least one other unit-cell actuator at a coupling region. Plural unit-cell actuators may be mechanically coupled in series, in parallel, or both, may be electrically connected in series, and may move along a defined curve or surface. A linear or curvilinear actuator includes a guide, a plurality of bearings or support elements slidable along the guide, and an array of actuators coupled between adjacent bearings and circumferentially about the bearings. An actuator includes a plurality of segments fanning from a hinge and shape memory alloy actuators coupled between adjacent segments to cause the segments to fan in an out about the hinge.

37 Claims, 16 Drawing Sheets

(56) References Cited

U.S. PATENT DOCUMENTS

| | | | |
|---|---|---|---|
| 5,405,337 | A | 4/1995 | Maynard |
| 6,447,478 | B1* | 9/2002 | Maynard ............... 604/95.05 |
| 6,772,479 | B2* | 8/2004 | Hinkley et al. ............... 16/225 |
| 6,832,478 | B2 | 12/2004 | Anderson et al. |
| 7,665,300 | B2 | 2/2010 | Biggs et al. |
| 2005/0125053 | A1* | 6/2005 | Yachia et al. ............... 623/1.15 |
| 2006/0186700 | A1* | 8/2006 | Browne et al. ............ 296/187.01 |
| 2006/0201149 | A1 | 9/2006 | Biggs et al. |
| 2007/0188986 | A1* | 8/2007 | Kobayashi ............... 361/679 |
| 2008/0007140 | A1 | 1/2008 | Izumi et al. |
| 2008/0018198 | A1 | 1/2008 | Sohn et al. |
| 2008/0080053 | A1 | 4/2008 | Homme |
| 2008/0097159 | A1 | 4/2008 | Ishiguro |
| 2008/0227060 | A1* | 9/2008 | Esashi et al. ............... 434/113 |
| 2009/0013684 | A1 | 1/2009 | Takahashi |

OTHER PUBLICATIONS

Elzey, D. M., et al., "A Bio-Inspired, High-Authority Actuator for Shape Morphing Structures," *Proc. of SPIE,* 5053: 92-100 (2003).

Cho, K., et al., "Design of Vast DOF Artificial Muscle Actuators With a Cellular Array Structure and Its Application to a Five-Fingered Robotic Hand," *IEEE International Conference on Robotics and Automation,* pp. 2214-2219 (May 2006).

Leester-Schädel, M., et al., "Micro Actuators on the Basis of Thin SMA Foils," *Microsyst. Technol.,* 14: 697-704 (2008).

Esfahani, E. T., et al., "Stable Walking Pattern for an SMA-Actuated Biped," *IEEE/ASME Transactions on Mechatronics,* 12(5): 534-541 (Oct. 2007).

Cho, K., et al., "Design, Fabrication and Analysis of a Body-Caudal Fin Propulsion System for a Microrobotic Fish," *IEEE International Conference on Robotics and Automation,* pp. 706-711 (May 2008).

Kim, S., et al., "Micro Artificial Muscle Fiber Using NiTi Spring for Soft Robotics," *IEEE/RSJ International Conference on Intelligent Robots and Systems,* pp. 2228-2234 (Oct. 2009).

Sugiyama, Y., et al., "Circular/Spherical Robots for Crawling and Jumping," *Proceedings of the 2005 IEEE International Conference on Robotics and Automation,* pp. 3595-3600 (Apr. 2005).

Loh, C. S., et al., "New Shape Memory Alloy Actuator: Design and Application in the Prosthetic Hand", Proceedings of the 27th *Annual International Conference Engineering in Medicine and Biology Society (IEEE-EMBS'05),* pp. 6900-6903 (Jan. 2006).

Ma, M., et al., "Control of Shape Memory Alloy Actuator Using Pulse Width Modulation", *Smart Mater.Struct.,* 12(5): 712 (2003).

Torres-Jara, E., et al., "Compliant Modular Shape Memory Alloy Actuators", *IEEE Robotics and Automation Magazine,* 17(4): 78-87 (Dec. 2010).

\* cited by examiner

FLEXIBLE ACTUATOR BASED ON SHAPE MEMORY ALLOY SHEET

RELATED APPLICATION

This application claims the benefit of U.S. Provisional Application No. 61/248,838, filed on Oct. 5, 2009.

The entire teachings of the above application are incorporated herein by reference.

GOVERNMENT SUPPORT

The invention was made with government support under Grant Numbers W911NF-08-C-0-0060 and W911NF-08-1-0228 awarded by the ARO. The Government has certain rights in the invention.

BACKGROUND OF THE INVENTION

Conventional actuators, such as electromagnetic motors and piezoelectric actuators, are components of many devices including medical instruments, robotic probes, consumer electronics and surveillance systems. Electromagnetic motors and piezoelectric actuators can be expensive and bulky, and can require complicated control electronics.

Shape memory alloy actuators are known, but can involve significant amounts of heat generation and can have high power requirements.

Alternatives to conventional actuators are needed in applications where space and weight are limited, such as laparoscopic medical probes, small robotic probes, and micro-lens positioning systems.

Laparoscopic procedures present a fast growing market in medical robotics. Laparoscopic probes require very small, yet powerful actuators to operate inside a patient's body. Conventional electric motors present limitations in size, weight, and transmission mechanisms.

Lenses placed in cameras, including auto focus and zoom lenses in digital cameras, often use piezoelectric motors, which are expensive to fabricate.

Furthermore, using conventional actuators for orienting small cameras, such as those used in surveillance systems, in small robots, or in consumer electronics, is difficult because conventional actuators typically require transmission mechanisms which add weight and size.

SUMMARY OF THE INVENTION

There is therefore a need in the art for improved actuator mechanisms suitable for actuators and arrays of such actuators.

A flexible unit-cell actuator includes a shape memory alloy sheet having a fold between adjacent legs in one state and a heat source that upon activation concentrates heating of the shape memory alloy sheet at the fold relative to the legs to change the fold between one state and another state.

The heat source may include resistive heating due to an electric current passing through the shape memory alloy sheet. The fold typically includes a reduced cross-sectional area as through slits at the fold to increase electrical resistance at the fold relative to the adjacent legs. The fold may form approximately a 180° bend in the shape memory alloy sheet in one of the states. The shape memory alloy sheet typically has bends from the respective legs to coupling regions, each bend including slits to increase electrical resistance at each bend relative to the adjacent legs. Each of the bends may form approximately a 90° bend in the shape memory alloy sheet in one of the states. In one embodiment, the unit-cell expands by at least 10% when the heat source is activated. In one embodiment, the unit-cell actuator expands by at least 50% when the heat source is activated. The unit-cell actuator may expand by about 57%. The shape memory alloy sheet may include a shape memory alloy selected from the group consisting of NiTi, CuZnAl, and CuAlNi.

An actuator array includes a plurality of flexible unit-cell actuators formed in a sheet. Each unit-cell actuator typically includes a shape memory alloy sheet having a fold between adjacent legs in one state and coupling regions. The unit-cell actuator further includes a heat source that upon activation concentrates heating of the shape memory alloy sheet at the fold relative to the legs to change the fold between the one state and another state. Each unit-cell actuator is typically mechanically coupled to at least one other unit-cell actuator at a coupling region.

Each unit-cell actuator may be coupled in series or in parallel to at least one other unit-cell actuator. Plural unit-cell actuators may be mechanically coupled in series, in parallel, or both and may be electrically connected in series. In one embodiment, plural unit-cell actuators are mechanically coupled in series, multiple such series mechanically coupled in parallel, and plural unit-cell actuators electrically connected in series.

An actuator includes a support structure having support elements and a plurality of flexible unit-cell actuators formed in a sheet and mechanically coupled to the support structure. Each flexible unit-cell actuator is typically mechanically coupled to one of the support elements at each coupling region. In an embodiment, the unit-cell actuators are arranged in a symmetrical pattern about an axis. At least one of the support elements may move along a curve when actuated by at least one of the unit-cell actuators. In some embodiments, at least one of the support elements may rotate about an axis when actuated by at least one of the unit-cell actuators. The unit-cell actuators are typically electrically connected in series. Plural unit-cell actuators may move along a defined surface.

A method of operating actuators includes providing a plurality of mechanically coupled actuators that follow a defined motion, each actuator including a support structure having support elements and a plurality of flexible unit-cell actuators formed in a sheet and mechanically coupled to the support structure. Each unit-cell actuator includes a shape memory alloy sheet having a fold between adjacent legs in one state and coupling regions. In addition, each unit-cell actuator includes a heat source that upon activation concentrates heating of the shape memory alloy sheet at the fold relative to the legs to change the fold between the one state and another state. Each unit-cell actuator is mechanically coupled to at least one other unit-cell actuator at a coupling region. The method further includes activating the heat sources of the unit-cell actuators to cause the unit-cell actuators to follow the defined motion. The motion may be along a curve or along a surface.

A linear or curvilinear actuator includes a guide, a plurality of bearings or support elements slidable along the guide, and an array of actuators coupled between adjacent bearings and circumferentially about the bearings. Each actuator includes a shape memory alloy sheet having a fold between adjacent legs, the legs joined at coupling regions to the bearings. The guide may be a straight rod and the actuator may drive a gripper.

An actuator includes a plurality of segments fanning from a hinge and shape memory alloy actuators coupled between adjacent segments to cause the segments to fan in an out about the hinge. Each of the actuators typically includes a fold between adjacent legs. The actuators may include an array of parallel actuators coupled between adjacent segments. In an embodiment, the actuator drives an optical device coupled between adjacent segments to cause the optical device to scan.

The disclosed embodiments of the invention have numerous advantages over the prior art. For example, linear and rotational actuators based on shape memory alloy sheets are small and lightweight as compared to conventional actuators, such as electromagnetic motors. In addition, an actuator based on a shape memory alloy sheet can have a high force-to-weight ratio of about 160 times its weight. Unlike small motors, a shape memory alloy actuator may not require transmission mechanisms. These advantages allow actuators based on a shape memory alloy sheet to be used in small spaces, such as in small robots, medical robotics, or small laparoscopic instruments.

Furthermore, shape memory alloy actuators of the present invention present a simple and cheap alternative to piezoelectric motors used in commercial cameras, which are expensive to fabricate. Moreover, shape memory alloy actuators formed in a sheet overcome limitations presented by actuators built with shape memory alloy wires. For example, the heat required to activate the shape memory alloy is focalized by controlling the electrical path through a shape memory alloy sheet. This is achieved by reducing the cross-sectional area of the shape memory alloy sheet at the folds and bends and by using slits in the shape memory alloy sheet. Furthermore, focusing heat to activate the shape memory alloy actuator avoids damage to the shape memory alloy structure as well as the support structure. Unlike designs using shape memory alloy wires, an actuator based on a shape memory alloy sheet can have an expansion ratio that is at least 10% and can be easily constructed by cutting a pattern to form the actuator from a shape memory alloy sheet.

Furthermore, shape memory alloy actuators of the present invention are easy to build and modular. An actuator based on a shape memory alloy sheet can be built by combining basic actuation units, or flexible unit-cell actuators, and by coupling them to a support structure. Depending on the combination of the flexible unit-cell actuators, the direction of actuation, the force generated, and the expansion or contraction of the actuator, also referred to as the stroke, can be controlled. For example, multiple actuation units can be combined in series to increase both the force and the expansion, or contraction, of the actuator. Multiple actuation units can be combined in parallel to increase the force of the actuator. Furthermore, by using different activation sequences of the actuation units, the pattern of expansion or contraction of the actuator can be controlled. For example, in an actuator having multiple unit-cell actuators coupled in series and multiple such series coupled in parallel, different expansion trajectories can be achieved by controlling independently each series of actuation units.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 10A shows the surface actuator forming a planar surface. FIG. 10B illustrates the surface actuator forming a curved surface. FIG. 10C illustrates a surface actuator forming a complex surface.

DETAILED DESCRIPTION OF THE INVENTION

A description of example embodiments of the invention follows.

Flexible actuators based on shape memory alloy sheets may be used to effect linear motion, rotational motion, or combinations of both. A principal purpose of actuators based on shape memory alloy sheets is to provide alternatives to conventional actuators, such as electromagnetic motors, in any applications where space and weight are limited, such as in laparoscopic medical probes, small robotic probes, and positioning devices for micro-lenses. In addition, a plurality of mechanically coupled actuators can provide an actuated surface capable of moving along an arbitrary motion in space. The actuators of the present invention can be built by combining basic actuation units. Depending on the combination of these basic actuation units, the direction of actuation, the force generated, and the expansion or contraction of the actuator can be controlled.

Figure 1A:
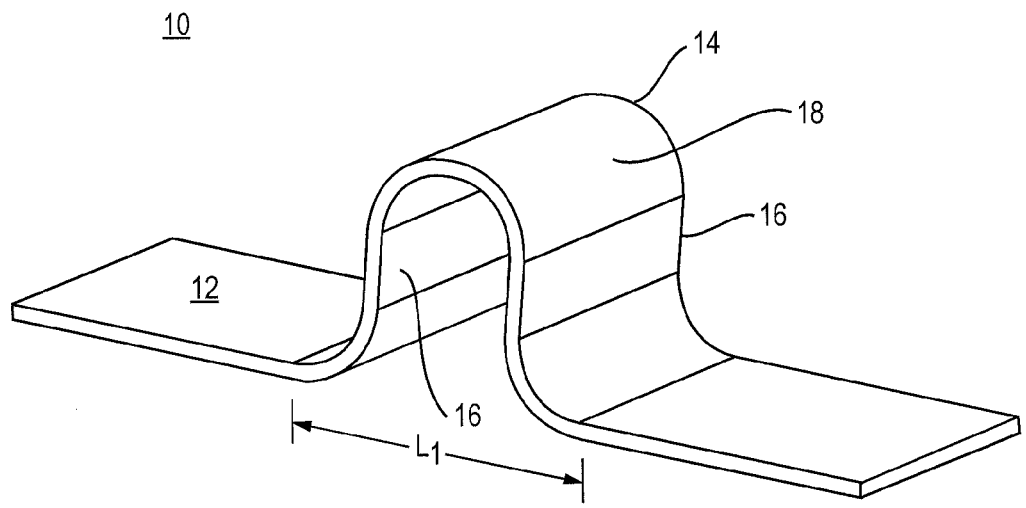
FIG. 1A is a perspective view of a flexible unit-cell actuator.
Figure 1B:
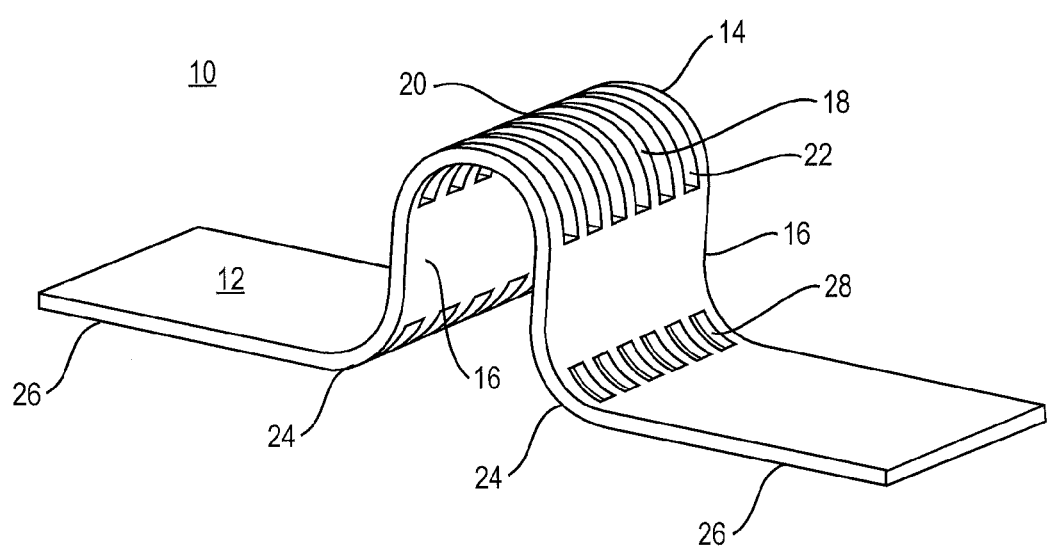
FIG. 1B is a perspective view of a flexible unit-cell actuator that includes slits.
Figure 2:
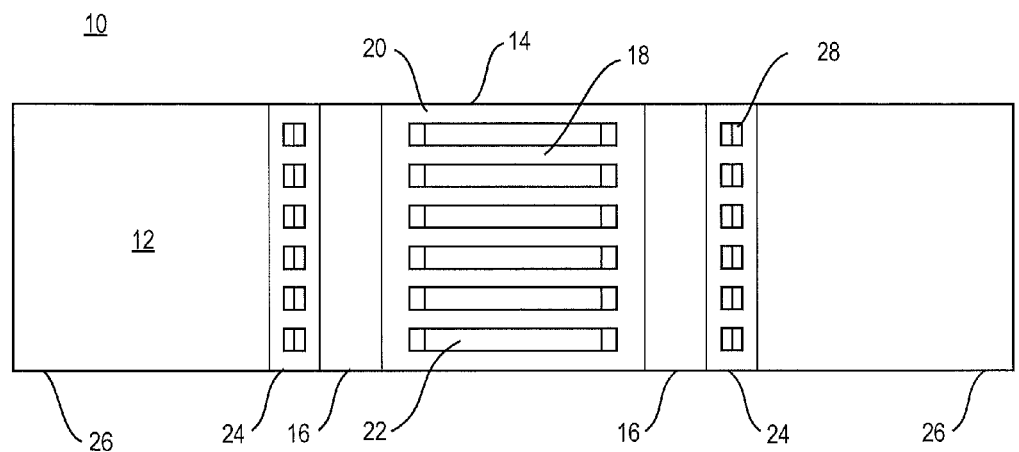
FIG. 2 is a top view of the flexible unit-cell actuator of FIG. 1B.

FIG. 1A illustrates a basic actuation unit, henceforth referred to as a flexible unit-cell actuator, according to an embodiment of the present invention. A flexible unit-cell actuator 10 includes a shape memory alloy sheet 12 having a fold 14 between adjacent legs 16 in one state. Flexible unit-cell actuator 10 further includes a heat source 18 that upon activation concentrates heating of the shape memory alloy sheet 12 at the fold 14 relative to legs 16 to change the fold 14 between the one state and another state. In a preferred embodiment, heat source 18 comprises resistive heating due to an electrical current passing through shape memory alloy sheet 12. As shown in FIGS. 1B and 2, fold 14 may include a reduced cross-sectional area 20 as through slits 22 to increase electrical resistance at fold 14 relative to adjacent legs 16. In one embodiment, fold 14 is an elastic deformation of shape memory alloy sheet 12 in one of the states, such that the sheet will return to its original shape with heating. For example, fold 14 may form approximately a 180° bend in shape memory alloy sheet 12 in one of the states. Shape memory alloy sheet 12 may further have bends 24 from the respective legs 16 to coupling regions 26. Each bend 24 may include slits 28 to reduce the cross-sectional area and thus increase electrical resistance in each bend 24 relative to adjacent legs 16. Each bend 24 may form approximately a 90° bend in shape memory alloy sheet 12 in one of the states. Bends 24 may be an elastic deformation of shape memory alloy sheet 12 in one of the states.

Shape memory alloy is a material that recovers its original or a programmed shape when heat is applied. For example, if a naturally flat sheet of shape memory alloy is folded, upon heat application it will become flat. In other words, upon heat application the shape memory alloy will transition from one state, e.g., at a state in which it has a folded shape, to another state, e.g., a state in which its shape is flat, or vice versa. In general, shape memory alloy can exist in two states or phases, referred to as martensite and austenite. In the martensitic state or phase, shape memory alloy is relatively easy to bend and stretch. The application of heat triggers a phase transition to the austenitic phase. The transition causes the shape memory alloy to exert force as it attempts to return to its original or programmed shape. The programmed shape can be set by annealing the shape memory alloy while physically constraining its shape.

In one embodiment, the flexible unit-cell actuator 10 includes a folded shape memory alloy sheet 12 that flattens when transitioning to the austenitic state. Transition from one state to another state occurs at a temperature that is specific to the shape memory alloy material. For example, in one embodiment, the shape memory alloy is a Nickel Titanium alloy (NiTi) and its transformation temperature is 95° Celsius. The shape memory alloy sheet 12 may include a NiTi alloy that transitions at a different temperature or may include another shape memory alloy. When a folded or bent shape memory alloy sheet is heated to its transition temperature, most of the force generated to transition to its original flat shape is concentrated at the fold or bend. The smaller the radius of the fold or bend, the greater is the force generated. In addition, the force generated decreases as the fold unfolds and the sheet flattens.

The flexible unit-cell actuator 10 shown in FIGS. 1A and 1B takes advantage of the principal of force generation in a shape memory alloy sheet that is folded. The central fold 14, which forms a bend of approximately 180° in shape memory alloy sheet 12 in one state, contributes more force than other parts of the unit-cell actuator, including bends 24, which form bends of approximately 90°. Typically, any parts of shape memory alloy sheet 12 between fold 14 and bends 24 do not contribute force to the flexible unit-cell actuator and may preferably be kept small. One reason for keeping the region between fold 14 and bends 24 small is that it does not do useful work. Another reason for keeping that region small is that it may not be rigid enough to effectively transmit force because the shape memory alloy sheet is typically thin In some embodiments of the present invention, bends 24 may not be present, as for example shown in FIG. 5B.

Coupling regions 26 may be used for coupling multiple flexible unit-cell actuators 10 together and for coupling unit-cell actuators 10 to a support structure. Coupling regions 10 may also be used to conduct electrical current to fold 14 and bends 24, to conduct electrical current between coupled unit-cell actuators 10, and to make electrical contact to a current or voltage source. Preferably, the electrical resistance provided to current passing through the shape memory alloy sheet 12 is less at the coupling region 26 than at fold 14 and bends 24. This reduces the power required to activate flexible unit-cell actuator 10 and avoids heating at the coupling regions, thereby facilitating mounting of the flexible unit-cell actuator 10 to a support structure. Focusing heat generation at bends 24 and fold 14 while avoiding heat production at other parts of shape memory alloy sheet 12 improves performance of the unit-cell actuator 10 because heat is delivered to areas of greatest force production while reducing thermal losses. Furthermore, avoiding heat production at the coupling regions 26 allows coupling of the flexible unit-cell actuator 10 to support elements that are heat sensitive, such as plastic supports.

Focused heating at the fold and bends may be achieved using a heating layer in thermal contact with the sheet memory alloy. Such heating layer may include resistive elements, such as thin film resistors, positioned to focus resistive heating at the fold and bends due to an electrical current passed through the resistive elements. The use of heating by electrical current through the shape memory alloy sheet offers the advantage of simplified wiring over using a separate heating layer, because heating may be concentrated at the fold and bends by the reduced cross-sectional area, such as through the use of slits.

Figure 3A:
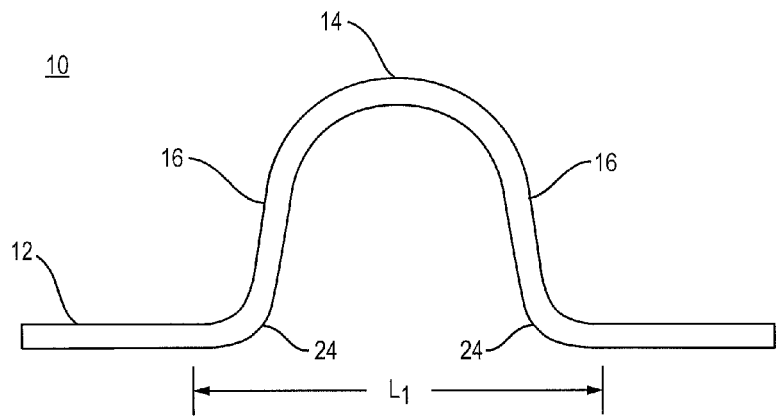
FIG. 3A is a schematic illustration of a flexible unit-cell actuator in a contracted state having length $L_1$.
Figure 3B:
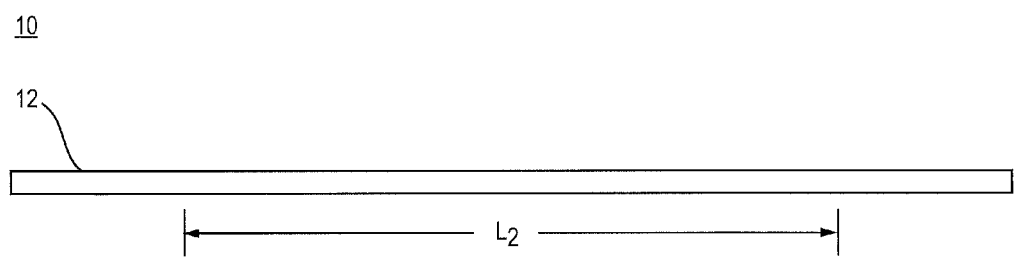
FIG. 3B is a schematic illustration of the flexible unit-cell actuator of FIG. 3A in an expanded state having length $L_2$.

FIG. 3A is a schematic illustration of a flexible unit-cell actuator 10 in a contracted state. As shown in FIG. 3A, the region of shape memory alloy sheet 12 of unit-cell actuator 10 that includes bends 24 and fold 14 has a length $L_1$ in a contracted state (see also FIG. 1A). FIG. 3B shows flexible unit-cell actuator 10 of FIG. 3A in an expanded state. As illustrated in FIG. 3B, the region having a length $L_1$ in a contracted state has a length $L_2$ in an expanded state. The expanded state shown in FIG. 3B may correspond to the original shape of shape memory alloy sheet 12 that is recovered when heat is applied to folded shape memory alloy sheet 12 shown in FIG. 3A. Heat may be applied uniformly to sheet memory alloy sheet 12. Preferably, heat is focused at fold 14 and bends 24 as described above with reference to FIG. 1B. In some embodiments, fold 14 forms approximately a 180° bend between adjacent legs 16, and bends 24 form approximately a 90° bend in the shape memory alloy sheet 12. Flexible unit-cell actuator 10 may expand by at least 10% upon activation by the heat source. In some embodiments, unit-cell actuator 10 expands by about 50% when activated. The unit-cell actuator 10 may expand by about 57% upon activation by heating. An expansion of 57% is the theoretical expansion of the unit-cell actuator 10 assuming the distance along legs 16 between the fold 14 and bends 24 is negligible and that fold 14 and bends 24 flatten upon activation of unit-cell actuator 10. The expansion may be measured as the ratio of $L_2$ to $L_1$ (FIG. 3).

In some embodiments, flexible unit-cell actuator 10 may contract when heat is applied to shape memory alloy sheet 12. For example, the original shape of shape memory alloy sheet 12 may include one or more folds or bends, such as fold 14 and bends 24 shown in FIG. 3A, which are recovered upon application of heat. Shape memory alloy sheet 12 may thus be conditioned or programmed to assume a folded shape when heat is applied. A variety of shapes may be programmed into a shape memory alloy sheet by physically constraining the sheet while heating it to an appropriate annealing temperature.

Typically, the shape memory sheet in any embodiment can be made of a shape memory alloy. As used herein, shape memory alloy can include any such alloy known to the art, for example, NiTi, CuZnAl, CuAlNi, and the like. Preferably, the shape memory alloy sheet is made of NiTi.

Shape memory alloy sheet 12 can be activated by resistive heating due to a current passed through the sheet, by thermal contact with a separate heating element, by radiant or convective heat transferred from an external heat source, or the like. In a preferred embodiment, shape memory alloy sheet 12 is activated by resistive heating due to a current passed through the sheet.

Figure 4:
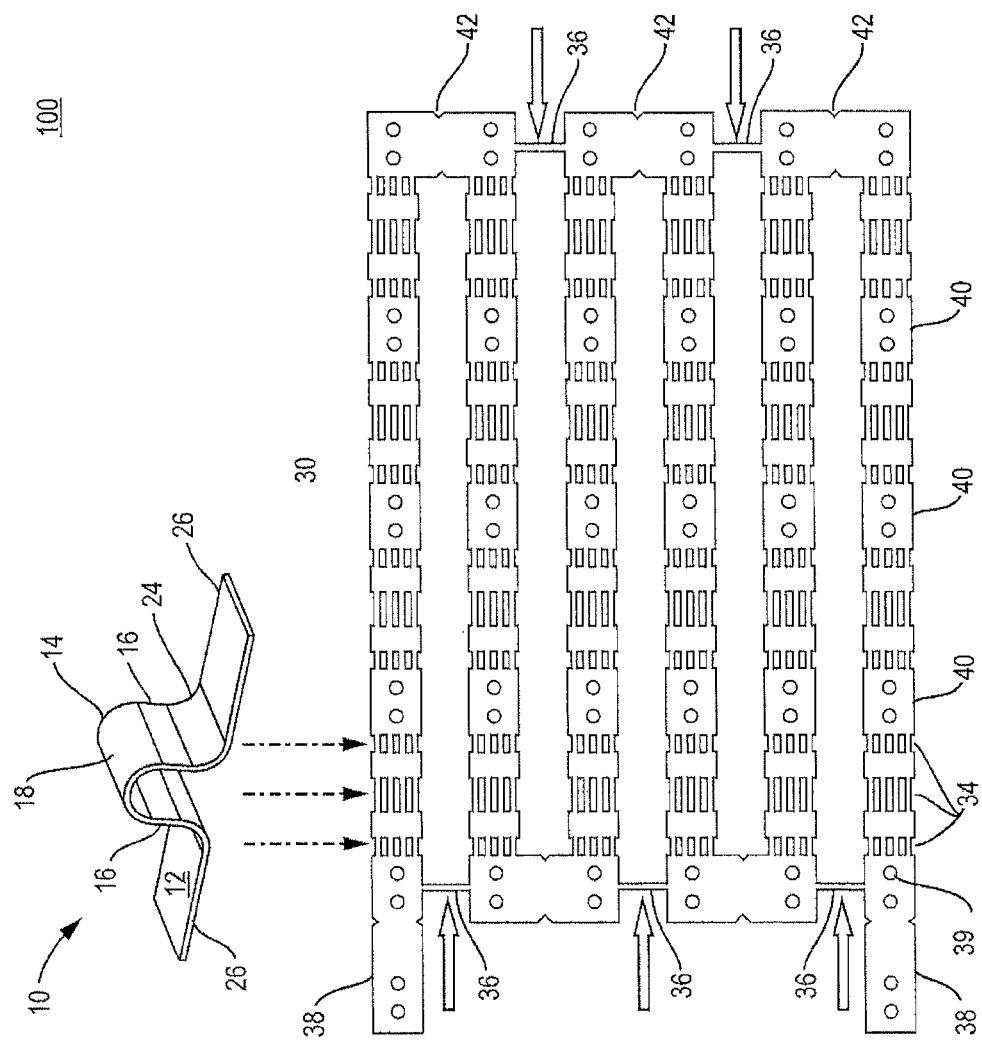
FIG. 4 is a plan view of a shape memory alloy pattern formed in a sheet and a perspective view of a single unit-cell actuator.

FIG. 4 illustrates a shape memory alloy pattern 30 formed in a shape memory alloy sheet. Pattern 30, for example, may be cut by a laser. Pattern 30 includes resistive elements 34, which correspond to regions of increased resistance at fold 14 and bends 24 of a flexible unit-cell actuator 10. Resistive elements 34 may include a reduced cross-sectional area 20 and slits 28, as shown in FIGS. 1B and 2. In the disclosed embodiment, shape memory alloy pattern 30 provides for 24 basic actuation units, such as flexible unit-cell actuators 10, arranged in 6 rows, each with 4 actuation units, as shown in FIG. 4. Shape memory alloy pattern 30 may include spacers 36 which facilitate assembly of a unit-cell actuator array. Spacers 36 are typically removed after assembly of the array or mounting of the array to a support structure. Spacers 36 may be removed by cutting out all or part of each spacer 36 from pattern 30 as indicated by hollow arrows in FIG. 4. Also included may be tabs 38 for connecting the shape memory alloy pattern 30 to a source of electrical current, which may be a current or voltage source, such as a battery or a power supply.

An actuator array 100, FIG. 4, includes a plurality of flexible unit-cell actuators 10 formed in a sheet, each unit-cell actuator 10 including shape memory alloy sheet 12 having a fold 14 between adjacent legs 16 in one state. Each unit-cell actuator 10 further includes heat source 18 that upon activation concentrates heating of shape memory alloy sheet 12 at fold 14 relative to legs 16 to change fold 18 between the one state and another state. Each unit-cell actuator 10 of array 100 is mechanically coupled to at least one other unit-cell actuator 10 at a coupling region 26. Coupling may be in series, such as shown at 40 in FIG. 4, or in parallel, such as shown at 42. In addition, each unit-cell actuator 10 of array 100 may be coupled to a support structure, e.g. structure 544 described below, such that a vertical column of six unit-cell actuators 10 of FIG. 4 is coupled in parallel at 40. Each heat source 18 typically comprises resistive heating due to an electrical current passing through each shape memory alloy sheet 12. Fold 14 may include a reduced cross-sectional area 20, FIG. 1B, such as through slits 22, to increase electrical resistance at fold 14 relative to adjacent legs 16. Each fold 14 may be an elastic deformation of shape memory alloy sheet 12 in one of the states, such that the sheet will return to its original shape with heating. Each fold 14 typically forms approximately a 180° bend shape memory alloy sheet 12 in one of the states. In addition, shape memory alloy sheet 12 may have bends 24 from respective legs 16 to coupling regions 26. Each bend 24 may include slits 28 to increase electrical resistance at each bend 24 relative to adjacent legs 16. Each of the bends 24 forms approximately a 90° bend in the shape memory alloy sheet 12 in one of the states. In an embodiment of actuator array 100, each unit-cell actuator 10 expands by at least 10% when heat source 18 is activated. In one embodiment, each unit-cell actuator 10 expands by at least 50% when heat source 18 is activated.

As shown in FIG. 4, plural unit-cell actuators 10 may be mechanically coupled in series and multiple such series are mechanically coupled in parallel. In one embodiment of actuator array 100, four unit-cell actuators 10 are coupled in series, as shown in FIG. 4 at 40, and multiple such series are coupled in parallel, as shown at 42. In addition, unit-cell actuators 10 of array 100 may be electrically connected in series. For example, after removing spacers 36, shape memory alloy pattern 30 provides a resistive path for current to flow from one tab 38 to another tab 38, all unit-cell actuators being electrically connected in series to allow simultaneous activation. Not all actuators 10 of array 100 need be electrically connected in series. Each actuator 10 may be independently activated. Plural unit-cell actuators 10 may be mechanically coupled in series and electrically connected in series. Furthermore, plural unit-cell actuators 10 may be mechanically coupled in parallel and electrically connected in series. In addition, each individual actuator 10 or groups of actuators 10 of array 100 may be connected to a separate current or voltage source. The connection to the electrical source may be at tabs 38, at coupling regions 26, or at other locations of array 100.

Figure 5A:
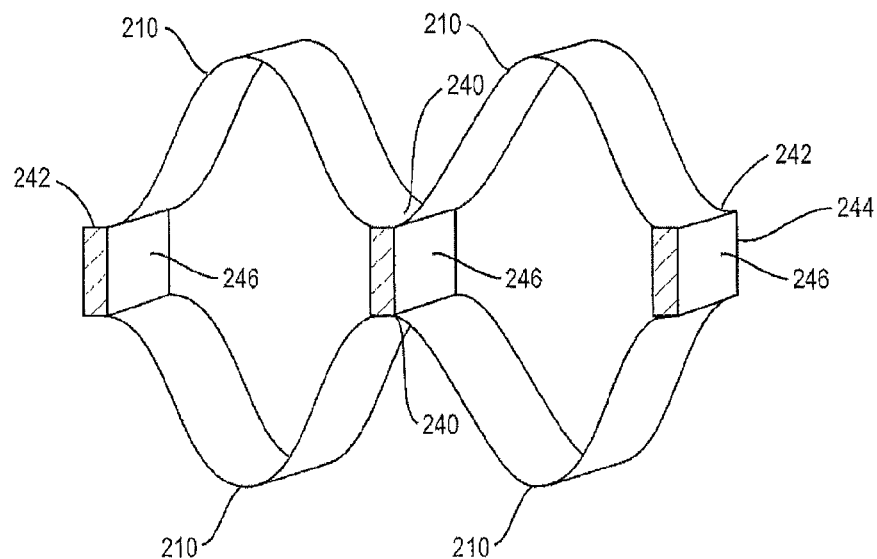
FIG. 5A is a schematic illustration of an actuator array that includes unit-cell actuators mechanically coupled in series and in parallel.

A schematic illustration of an actuator array according to an embodiment of the present invention is shown in FIG. 5A. Actuator array 200 includes a plurality of flexible unit-cell actuators 210, such as unit-cell actuators 10 described above with reference to FIGS. 1A and 1B. Unit-cell actuators 210 and array 200 may be formed in a sheet, such as unit-cell actuators 10 and array 100 described above with reference to FIG. 4. Each unit-cell actuator 210 typically includes a shape memory alloy sheet 12 having a fold 14 between adjacent legs 16 in one state. Also included is heat source 18 that upon activation concentrates heating of the shape memory alloy sheet 12 at fold 14 relative to legs 16 to change fold 14 between the one state and another state. In addition, each unit-cell actuator 210 is mechanically coupled to at least one other unit-cell actuator 210 at a coupling region 26. Flexible unit-cell actuators 210 may be coupled in series, they may be coupled in parallel, as shown in FIG. 5A at 242, or they may be coupled in series and in parallel, as shown in FIG. 5A at 240. Unit-cell actuators 210 may be coupled to each other, may be coupled to a support structure 244, or both. Support structure 244 may include support elements 246.

Figure 5B:
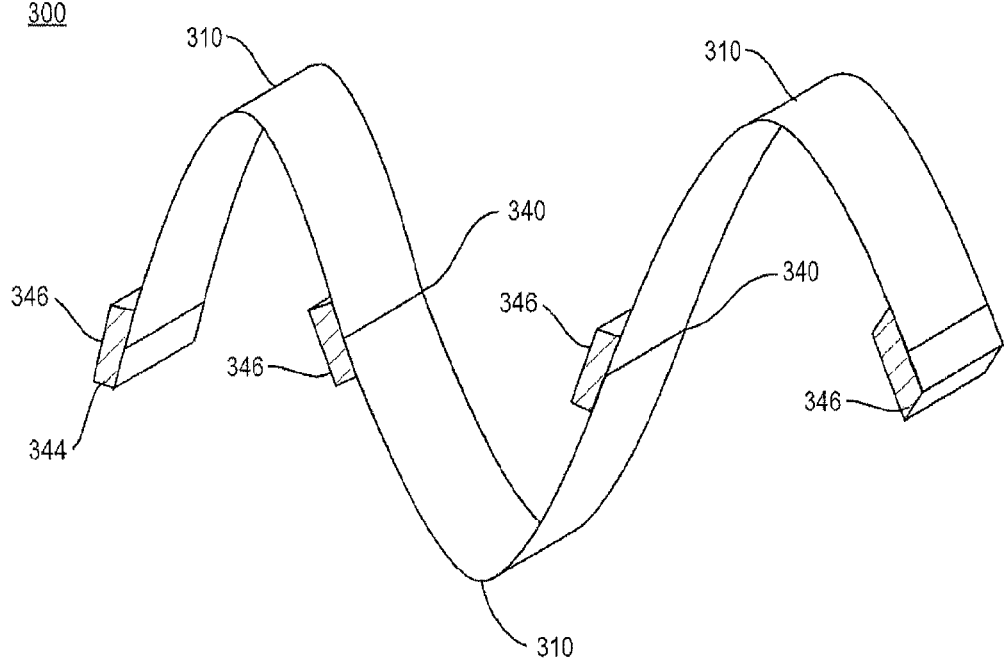
FIG. 5B is a schematic of an actuator array where each unit-cell actuator is mechanically coupled in series to at least one other unit-cell actuator.

A schematic illustration of an actuator array 300 according to another embodiment of the present invention is shown in FIG. 5B. Actuator array 300 includes a plurality of flexible unit-cell actuators 310 coupled in series as shown at 340. Flexible unit-cell actuators 310 may be Banned in a sheet, such as flexible unit-cell actuators 10, described above with reference to FIGS. 1A and 1B. The plurality of unit-cell actuators 310 may be an array of actuators, such as array 100 described above with reference to FIG. 4. Flexible unit-cell actuators 310 may be coupled to each other, may be coupled to support structure 344 including support elements 346, or both. Typically, one or more support elements 246 and 346, FIGS. 5A and 5B, respectively, are movable and each unit-cell actuator 210 and 310, FIGS. 5A and 5B, respectively, is coupled to at least one movable support element.

Figure 6:
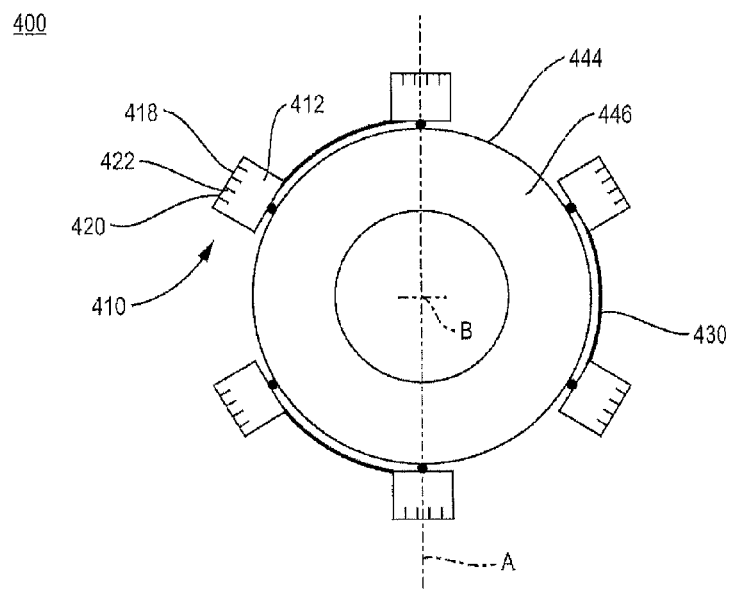
FIG. 6 is an end view of an actuator that includes a support structure and a plurality of flexible unit-cell actuators.
Figure 7:
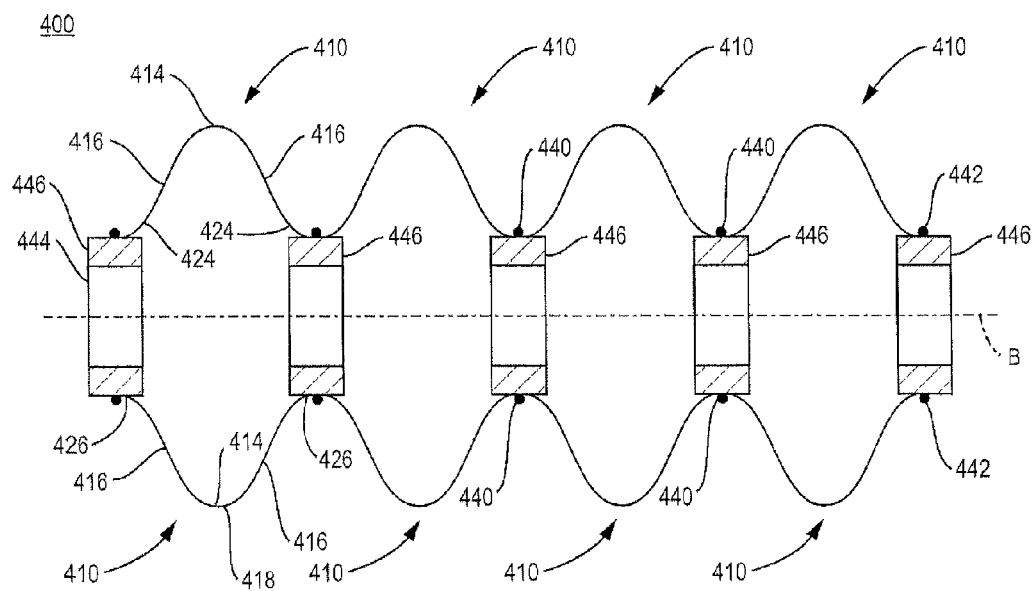
FIG. 7 is a longitudinal sectional view of the actuator of FIG. 6.

FIG. 6 is an end view of an actuator that includes a plurality of flexible unit-cell actuators and a support structure according to an embodiment of the present invention. FIG. 7 is a longitudinal sectional view of the actuator of FIG. 6. Actuator 400 includes support structure 444 having support elements 446. Actuator 400 further includes a plurality of flexible unit-cell actuators 410 formed in a sheet and mechanically coupled to support structure 444. Unit-cell actuators 410 may be formed in a sheet with shape memory alloy pattern 430, such as unit-cell actuators 10 described above with reference to FIGS. 1-4 and shape memory alloy pattern 30 described above with reference to FIG. 4. Typically, each unit-cell actuator 410 includes shape memory alloy sheet 412 having a fold 414 between adjacent legs 416 in one state and coupling regions 426. Each unit-cell actuator 410 further includes heat source 418 that upon activation concentrates heating of the shape memory alloy sheet 412 at the fold 414 relative to the legs 416 to change the fold 414 between the one state and another state. In addition, each unit-cell actuator 410 is further mechanically coupled to at least one other unit-cell actuator at a coupling region 426.

In a preferred embodiment, each heat source 418 comprises resistive heating due to an electrical current passing through each shape memory alloy sheet 412, FIG. 6. Typically, each fold 414, FIG. 7, includes a reduced cross-sectional area 420, FIG. 6, to increase electrical resistance at the fold relative to adjacent legs 416, such as through slits 422, FIG. 6. Each fold 414 may be an elastic deformation of shape memory alloy sheet 412 and may form approximately a 180° bend in the shape memory alloy sheet 412 in one state. Furthermore, each shape memory alloy sheet 412 may have bends 424 from respective legs 416 to coupling regions 426. Each bend 424 may form approximately a 90° bend in the shape memory alloy sheet in one state and may also include slits to increase electrical resistance at each bend relative to adjacent legs 416. In some embodiments, each unit-cell actuator 410 expands by about 10% when respective heat source 418 is activated. Each unit-cell actuator 410 may expand by about 50% when respective heat source 418 is activated.

Using the array of FIG. 4, plural unit-cell actuators 410 may be mechanically coupled in series, as shown at 440 in FIG. 7, and may be electrically connected in series. Alternatively or in addition, plural unit-cell actuators 410 may be mechanically coupled in parallel, as shown at 442, and also at 440, in FIG. 7, and may be electrically connected in series. In a preferred embodiment, plural unit-cell actuators 410 are mechanically coupled in series and multiple such series are mechanically coupled in parallel. For example, as shown in FIGS. 6 and 7, four unit-cell actuators 410 are coupled in series and six such series are coupled in parallel. Unit-cell actuators 410 are also mechanically coupled to support structure 444. As shown in FIG. 7, each unit-cell actuator 410 is coupled between two adjacent support elements 446. Thus, a group of six unit-cell actuators 410 is mechanically coupled in parallel and four such groups are mechanically coupled in series along axis B of FIG. 7. Furthermore, such plural unit-cell actuators coupled in series and in parallel may be electrically connected in series. Connecting the unit-cell actuators 410 in series allows for a single electrical current source to simultaneously activate all unit-cell actuators of actuator 400.

In one embodiment, each flexible unit-cell actuator 410 is mechanically coupled to one of the support elements 446 at each coupling region 426, as shown in FIG. 7. In addition, unit-cell actuators 410 may be arranged in a symmetrical pattern about an axis. For example, unit-cell actuators 410 are arranged in a symmetrical pattern around axis B, as shown in FIGS. 6 and 7.

Figure 8A:
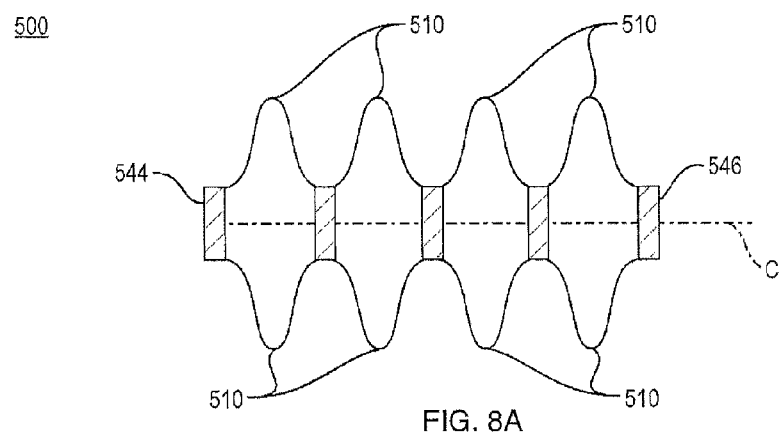
FIG. 8A is a schematic illustration of a linear actuator.
Figure 8B:
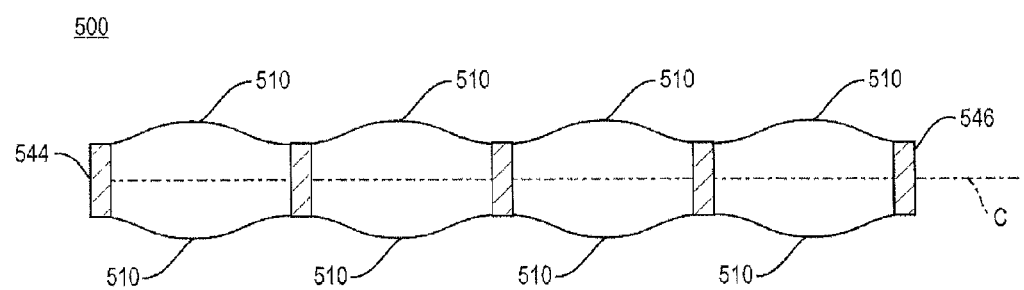
FIG. 8B is a schematic illustration of the linear actuator of FIG. 8A in an expanded state.

FIG. 8A is a schematic illustration of a linear actuator according to an embodiment of the present invention. Actuator 500 includes a plurality of flexible unit-cell actuators 510, such as flexible unit-cell actuators 410 described above with reference to FIGS. 6 and 7, and support structure 544 having support elements 546. Each unit-cell actuator 510 includes a shape memory alloy sheet having a fold between adjacent legs in one state, and a heat source that upon activation concentrates heating of the shape memory alloy sheet at the fold relative to the legs to change the fold between the one state and another state. As flexible unit-cell actuators 510 transition from one state, FIG. 8A, to another state, FIG. 8B, at least one of the support elements 546 moves along a line C when actuated by unit-cell actuators 510. As illustrated in FIG. 8B, all unit-cell actuators 510 may be activated but they need not be. In some embodiments, one support element 546 may be fixed and the remaining support elements 546 may be movable along line C when actuated by unit-cell actuators 510.

Figure 8C:
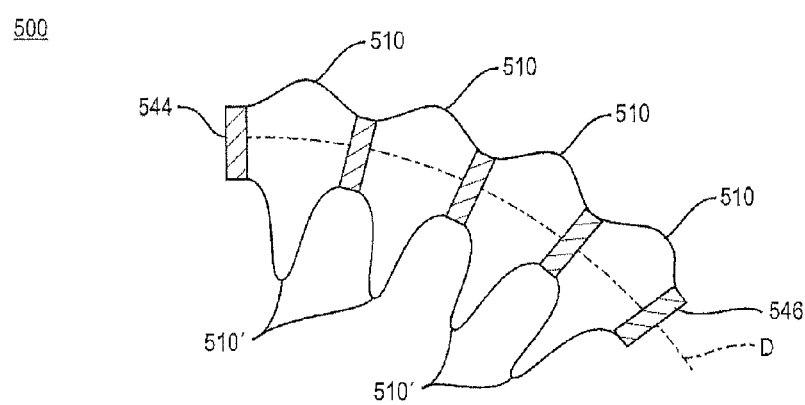
FIG. 8C is a schematic illustration of a curvilinear actuator for motion along a curve.

A schematic illustration of an actuator for motion along a curve according to an embodiment of the present invention is shown in FIG. 8C. Actuator 500 includes support structure 544 having support elements 546 and a plurality of flexible unit-cell actuators 510 and 510' mechanically coupled to the support structure. When actuated by at least one of the unit-cell actuators 510 and 510' at least one of the movable support elements 546 moves along curve D. As shown in FIG. 8C, movement along curve D may be achieved by activating unit-cell actuators 510, which may be located on one side of actuator 500, while not activating unit-cell actuators 510' located on the opposite side of actuator 500. Alternatively or in addition, movable support elements 546 may be guided along curve D by a guide (not shown) when actuated by at least one of the unit-cell actuators 510 and 510'.

Figure 9A:
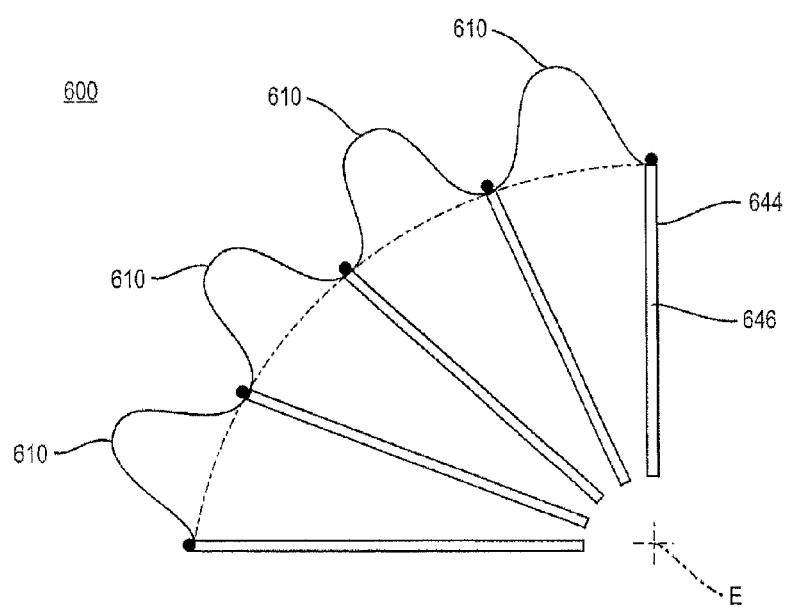
FIG. 9A is a schematic illustration of an actuator for rotational motion that includes support elements arranged in a fan-like fashion.

FIG. 9A is a schematic illustration of an actuator for rotational motion that includes support elements arranged in a fan-like fashion. Actuator 600 includes support structure 644 having support elements 646 and a plurality of flexible unit-cell actuators 610 mechanically coupled to the support structure 644. Support elements 646 may be arranged in a fan-like fashion around an axis of rotation, such as axis E shown in FIG. 9A. In some embodiments, one or more support elements 646 may be movable around axis E. Preferably, at least one of the support elements 646 rotates about axis E when actuated by at least one of the unit-cell actuators 610. Each unit-cell actuator 610 includes a shape memory alloy sheet having a fold between adjacent legs in one state. Also included is a heat source that upon activation concentrates heating of the shape memory alloy sheet at the fold relative to the legs to change the fold between the one state and another state. In addition, each unit-cell actuator 610 is mechanically coupled to at least one other unit-cell actuator at a coupling region.

Figure 9B:
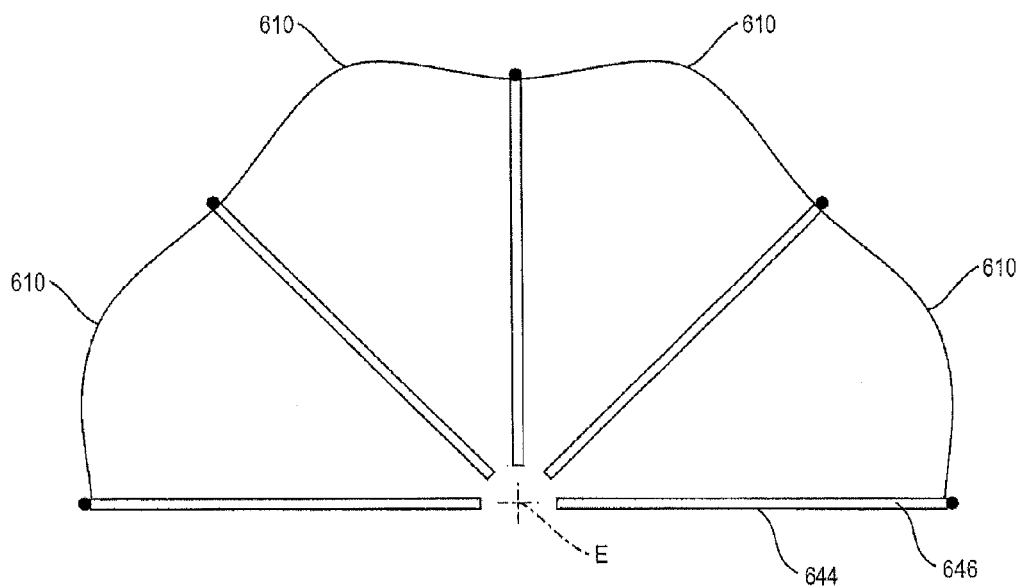
FIG. 9B is a schematic of the actuator of FIG. 9A in an expanded state.

FIG. 9B shows unit-cell actuator 600 of FIG. 9A in the other state after at least one of the support elements 646 has rotated about axis E. In some embodiments, one or more of the support elements 646 may be fixed while the other support elements 646 may be movable. As shown in FIGS. 9A and 9B, movable support elements 646 may rotate about axis E when actuated by flexible unit-cell actuators 610. In a preferred embodiment, all unit-cell actuators 610 of actuators 600 may actuate movable support elements 646 upon activation by a heat source. For example, all unit-cell actuators 610 may be electrically connected in series allowing for simultaneous activation of unit-cell actuators 610 by a current source.

Figure 10A:
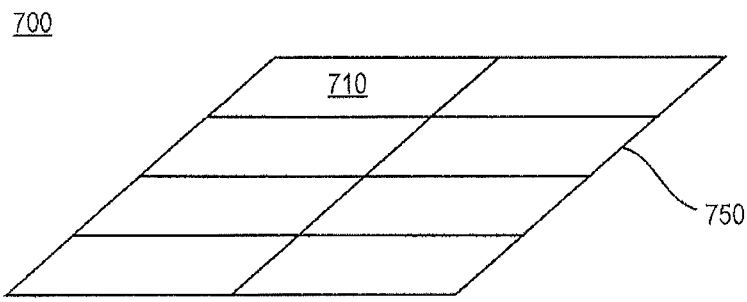
FIGS. 10A-C illustrate a surface actuator comprising a plurality of actuators.
Figure 10B:
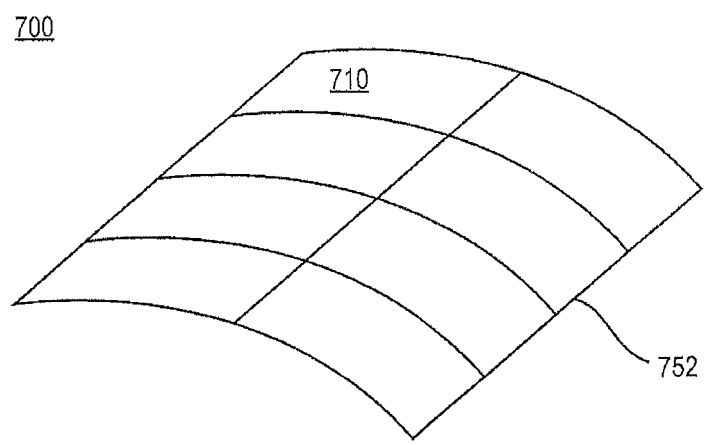
Figure 10C:
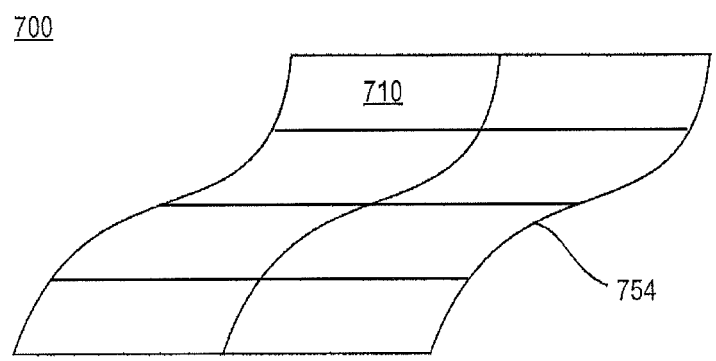

A surface actuator comprising a plurality of actuators according to an embodiment of the present invention is illustrated in FIGS. 10A-C. Actuator 700 includes a plurality of flexible unit-cell actuators 710, such as flexible unit-cell actuators 10 described above with reference to FIGS. 1A-2, and may also include a support structure having support elements (not shown). The plurality of flexible unit-cell actuators 710 may be formed in a sheet, such as actuator array 100 formed in sheet 30 described above with reference to FIG. 4B, and may be mechanically coupled to the support structure. FIG. 10A shows surface actuator 700 forming a planar surface 750. Surface actuator 700 operates by activating plural actuators 710 along a defined motion that is along a surface. For example, plural unit-cell actuators 710 may move along a defined motion that is along a simple curved surface, such as surface 752 shown in FIG. 10B, or along a complex surface, such as surface 754 shown in FIG. 10C, or along a surface that includes a combination of surfaces, such as surfaces 752 and 754.

The support elements of the support structure may form a surface and the unit-cell actuators 710 may be coupled to the support elements to articulate or give shape to the surface. The surface may be a plane, such as surface 750 shown in FIG. 10A, and the unit-cell actuators may articulate the surface in multiple directions, resulting in a complex surface, such as surface 754 shown in FIG. 10C.

A method of operating actuators includes defining a motion and providing a plurality of mechanically coupled actuators that follow the motion. The motion may be along a line C or curve D as shown in FIGS. 8A-C, or along a surface as shown in FIGS. 10A-C. The motion may also be a rotation about an axis E as shown in FIGS. 9A and B. The plurality of mechanically coupled actuators that follows the motion may include actuators such as actuator 400, FIGS. 6-7, actuator 500, FIGS. 8A-C, actuator 600, FIGS. 9A-B, and actuator 700, FIGS. 10A-C. As described above with respect to actuator 400 shown in FIGS. 6-7, each actuator may include a support structure 444 having movable and fixed support elements 446 and a plurality of flexible unit-cell actuators 410 formed in a sheet and mechanically coupled to the support structure 446. Each unit-cell actuator 410 may further include a shape memory alloy sheet 412 having a fold 414 between adjacent legs 416 in one state and coupling regions 426. In addition, each unit-cell actuator 410 may include a heat source that upon activation concentrates heating of the shape memory alloy sheet 412 at the fold 414 relative to legs 416 to change the fold 414 between the one state and another state. Furthermore, each unit-cell actuator 410 may be mechanically coupled to at least one other unit-cell actuator at a coupling region 426.

Various actuators may be constructed by using a shape memory alloy pattern and an array of unit-cell actuators formed in a sheet, such as pattern 30 and array 100 shown in FIG. 4. After shape memory alloy pattern 30 has been cut from a shape memory alloy sheet, for example by laser cutting, pattern 30 can be coupled to a support structure. Preferably, coupling occurs at coupling regions 26, FIG. 4, of unit-cell actuators 10. Coupling regions 26 may include holes 39, as shown in FIG. 4, to facilitate coupling to the support structure via mechanical fasteners. Unit-cell actuator array 100 defined by shape memory alloy pattern 30 may also be coupled to a support structure by any other means, such as gluing, bonding, stapling or press fitting. After unit-cell actuator array 100 defined by shape memory alloy pattern 30 has been coupled to the support structure, folds 14 of individual flexible unit-cell actuators 10 may be formed by bending each shape memory alloy sheet 12. In a similar fashion, bends 24, FIG. 1B, may be formed in each shape memory alloy sheet 12. Alternatively, folds 14 and bends 24 of individual flexible unit-cell actuators 10 may be formed by bending each shape memory alloy sheet 12 prior to coupling actuator array 100 to a support structure.

The foregoing description typically applies to flexible unit-cell actuators that will expand upon activation by a heat source. Because the resting state of the shape memory alloy 12 is flat, when a bent unit-cell actuator 10 is heated, it will try to flatten. A flexible unit-cell actuator 10, however, may be conditioned or programmed such that unit-cell actuator 10 will contract upon activation by a heat source. This can be accomplished by annealing the shape memory alloy while it is bent. Furthermore, when fabricating an actuator using an array or unit-cell actuators 10, some unit-cell actuators 10 may be configured to contract upon activation by a heat source while others might be configured to expand.

Figure 11:
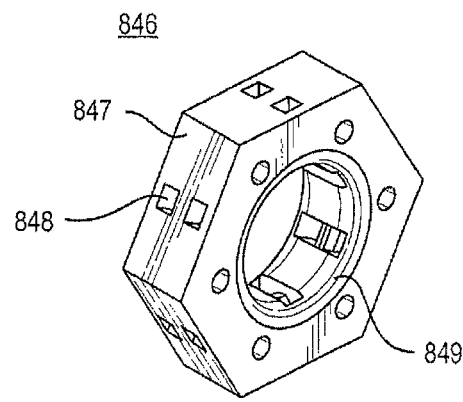
FIG. 11 is a perspective view of a support element for a shape memory alloy actuator.

A support element of an actuator for linear or curvilinear motion according to an embodiment of the present invention is shown in FIG. 11. Support element 846 includes coupling surfaces 847 for coupling support element 846 to coupling regions of flexible unit-cell actuators, such as coupling regions 26 of flexible unit-cell actuator 10 (FIG. 4). Support element 846 may also include holes 848 to facilitate coupling. For example, holes 848 may be adapted to receive a fastener, such as a wire, and may be configured to align with holes in a coupling region of a unit-cell actuator, such as holes 39 in the coupling region 26 of flexible unit-cell actuator 10, FIG. 4. Support element 846 may also include aperture 849. Aperture 849 may be adapted to receive a guide element to guide the movement of support element 846 when actuated by a unit-cell actuator. Aperture 849 may also function to reduce the weight of support element 846 and consequently the weight of the overall actuator.

Figure 12:
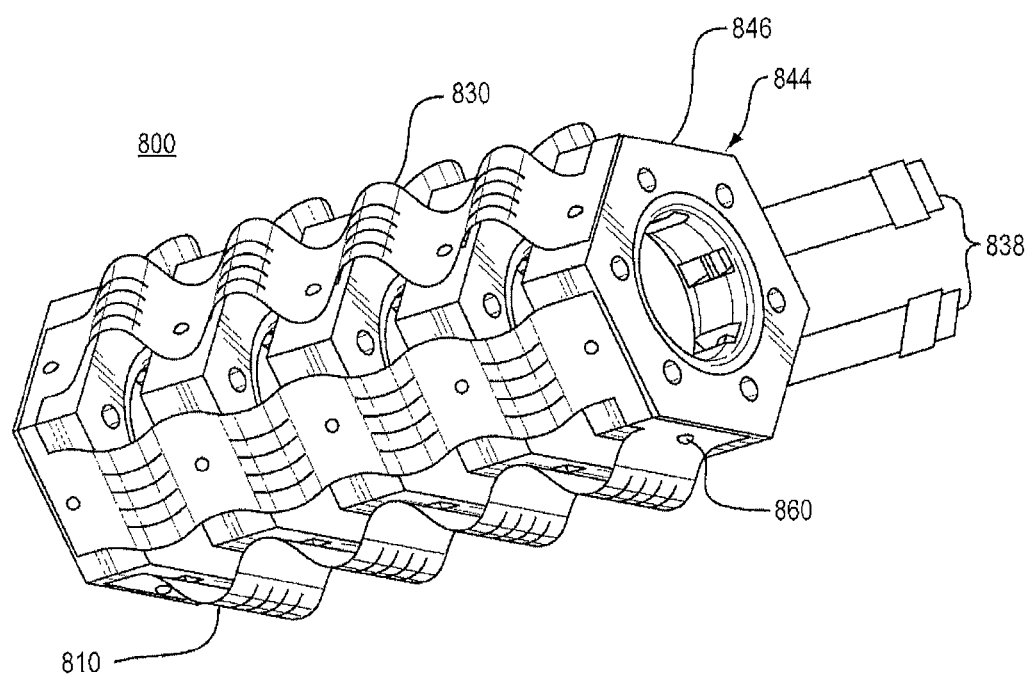
FIG. 12 is a perspective view of an actuator including a support structure having support elements of FIG. 11.

FIG. 12 shows a perspective view of an actuator 800 constructed using support elements 846 of FIG. 11. Actuator 800 includes a support structure 844 that includes five support elements 846. Coupled to support structure 844 is shape memory alloy pattern 830, which may be a shape memory alloy pattern such as pattern 30 shown in FIG. 4. Actuator 800 may be constructed by wrapping shape memory alloy pattern 830 around support structure 846 and coupling each support element 844 to coupling regions 26 of individual unit-cell actuators 810 using fasteners 860. Fasteners 860 may be pieces of wire, such as copper wire, and may be threaded through holes 848 in support elements 844 and tied to shape memory alloy pattern 830. Holes in shape memory alloy pattern 830, such as holes 39 in shape memory alloy pattern 30, FIG. 4, may facilitate coupling to support elements 844. Also included are tabs 838 for connecting the array of flexible unit-cell actuators 810 to an electrical current or voltage source. As shown in FIG. 12, actuator 800 may include 24 flexible unit-cell actuators 810 arranged in four sections of six columns each. The array of unit-cell actuators 810 may be coupled to five support elements 846 whereby unit-cell actuators 810 in each section straddle two support elements 846 and neighboring sections of unit-cell actuators 810 share one support element 846. In this way, each section of unit-cell actuators 810 is mechanically coupled in series to an adjacent section of unit-cell actuators 810 and unit-cell actuators within each section are coupled in parallel.

Figure 13:
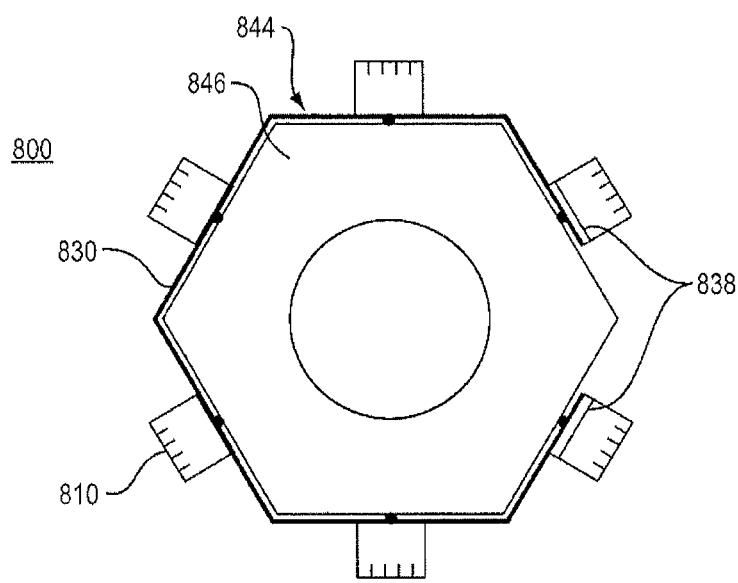
FIG. 13 is an end view of the actuator of FIG. 12.

FIG. 13 is an end view of unit-cell actuator 800 of FIG. 12 and illustrates the symmetrical arrangement of unit-cell actuators 810 around support structure 844 that includes five support elements 846. In a preferred embodiment, FIG. 11, each support element 846 has six coupling surfaces 847 arranged in a hexagonal pattern. The coupling surfaces 847 of all support elements 846 are aligned such that columns of actuators 810 are positioned in a symmetrical pattern around an axis extending through the center of support structure 844. This symmetrical arrangement facilitates linear motion of the support elements 846 when actuated upon by actuators 810. In a preferred embodiment, all actuators 810 are electrically connected in series and may be activated simultaneously by a current or voltage source.

Figure 14:
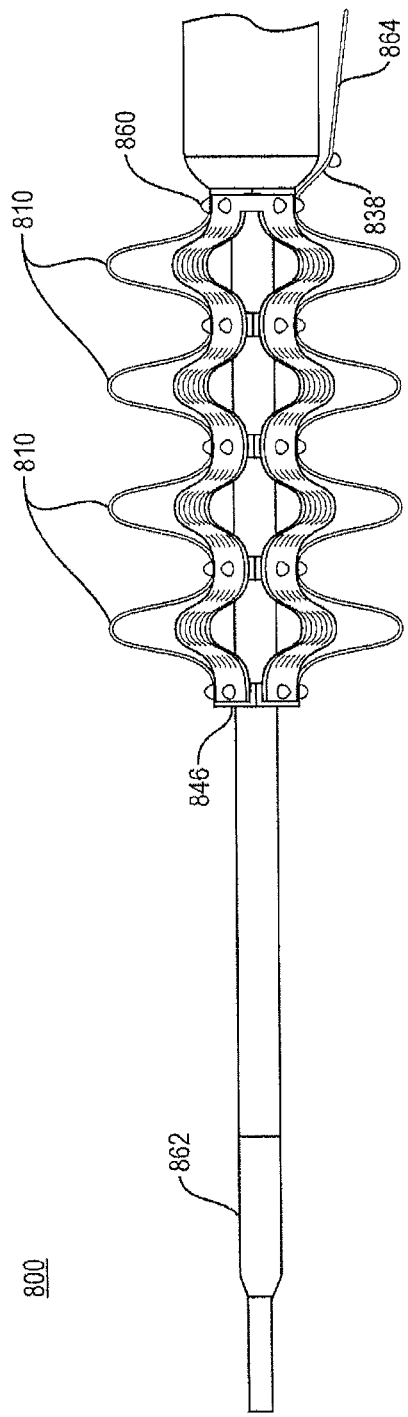
FIG. 14 is a side view of an actuator shown in contracted state.
Figure 15:
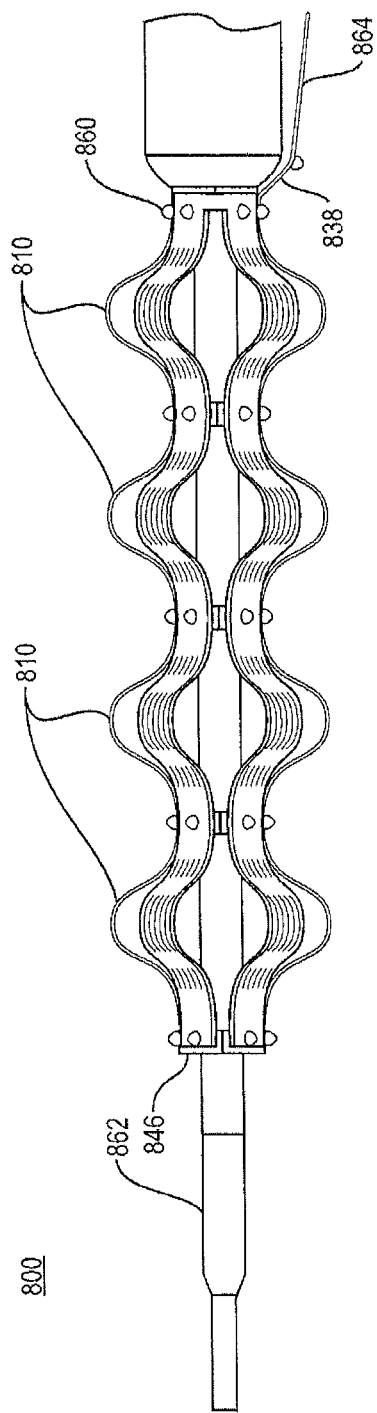
FIG. 15 is another side view of the actuator of FIG. 14 shown in an expanded state.

FIGS. 14 and 15 are side views of the actuator 800 of FIG. 12 mounted on guide 862 and connected to current source 864 at tabs 838. Actuator 800 includes 24 unit-cell actuators 810 coupled to five support elements 846 by means of fasteners 860. FIG. 14 shows actuator 800 in a contracted state while FIG. 15 shows actuator 800 in an expanded state. In the absence of application of current from current source 864, no resistive heating occurs at the folds and bends of flexible unit-cell actuators 810. When current flows from current source 864 through the array of unit-cell actuators 810, resistive heating at the folds and bends causes the shape memory alloy to change from one state to another state thereby causing the unit-cell actuators 810 to expand as shown in FIG. 15. Given the larger cross-sectional area in the coupling regions and legs due to the lack of slits, little heat is generated in those regions, thus minimizing thermal losses when heat does not contribute to actuation.

As unit-cell actuators 810 expand, they actuate support elements 846 which move along guide 862. Support elements 846 may include bearings slidable along guide 862. Guide 862 may be a straight rod. Movement along guide 862 is facilitated by aperture 849, FIG. 11, in each support element 846. Although guide 862 in FIG. 15 is shown to be linear, it may be curved, in which case support elements 846, upon actuation by unit-cell actuators 810, move along a curved path.

A prototype of a linear actuator, such as actuator 800 shown in FIGS. 14 and 15 was built. It requires 1.5 A and 4 V and consumes 6 W of power. The actuator weighs 0.5 g and can apply a maximum force of 80 gf (0.784 N). Consequently, its force-to-weight ratio is 1568 N/Kg. This is equivalent to lifting 80 g with a weight of 0.5 g, which gives a ratio of 160. In other words, the actuator can lift 160 times its weight disregarding the weight of the power supply.

Figure 16:
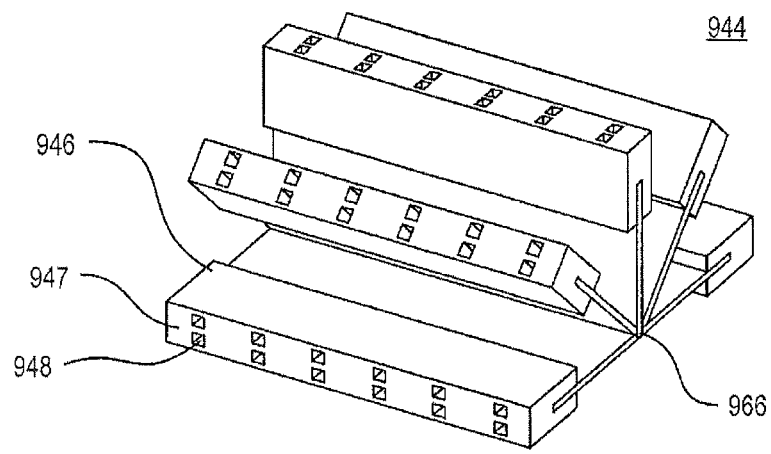
FIG. 16 is a perspective view of a support structure for a rotational actuator.

A support structure for a rotational actuator according to an embodiment of the present invention is shown in FIG. 16. Support structure 944 includes segments, such as support elements 946, arranged in a fan-like fashion. In one embodiment, support structure 944 includes five support elements 946. Each support element 946 may include coupling surface 947 for coupling support element 946 to an array of actuators, such as array 100 shown in FIG. 4. Each surface 947 may further include holes 948 to facilitate coupling of each support element 946 to coupling regions of unit-cell actuators, such as coupling regions 26 of flexible unit-cell actuators 10 shown in FIG. 4. Typically, support elements 946 are rotatably coupled to each other at a hinge 966. Preferably, hinge 966 is coupled to each support element 946 at an end opposite coupling surface 947.

Figure 17:
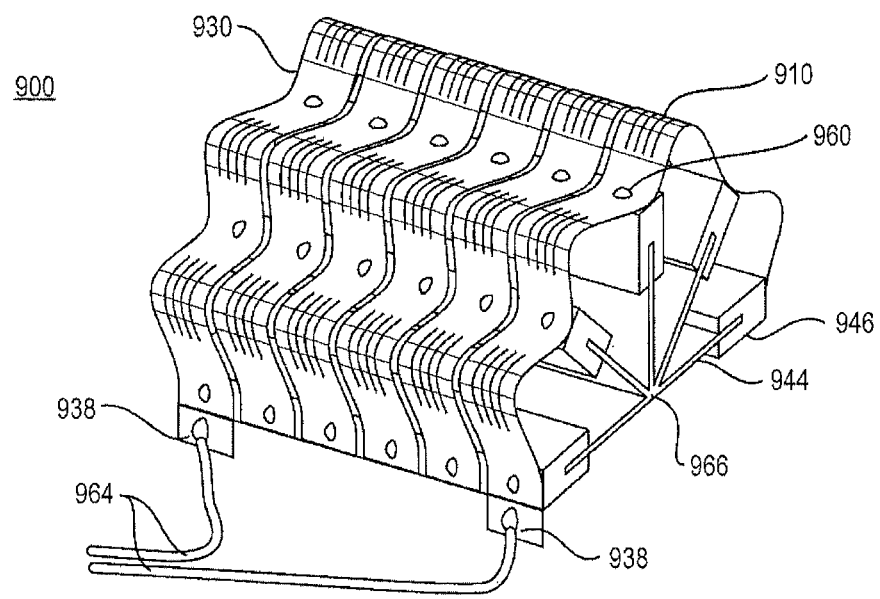
FIG. 17 is a perspective view of an actuator including the support structure of FIG. 16 and a plurality of flexible unit-cell actuators formed in a sheet.

FIG. 17 shows a perspective view of a rotational actuator 900 that includes support structure 944 of FIG. 16. Actuator 900 further includes flexible unit-cell actuators 910 formed in a sheet according to shape memory alloy pattern 930. In the disclosed embodiment, shape memory alloy pattern 930 defines 24 unit-cell actuators 910 arranged in four sections of six columns each, such as shape memory alloy pattern 30 shown in FIG. 4. Unit-cell actuators 910 may be coupled to support structure 944 such that each section of unit-cell actuators 910 is coupled to two support elements 946 whereby neighboring sections of unit-cell actuators 910 share one support element 946. Each unit-cell actuator 910 may be coupled at coupling regions 26, FIG. 4, by means of fasteners 960. As shown in FIG. 17, fasteners 960 may be pieces of wire fed through holes 948 in support elements 946 and whose ends are twisted together. Fasteners 960 may tie coupling regions 26 of unit-cell actuators 910 to support elements 946 at coupling regions 947. Actuator 900 may also include tabs 938 for connecting the actuator to a current source 964. In a preferred embodiment, all unit-cell actuators 910 are electrically connected in series and can be activated simultaneously by source 964. Upon activation, unit-cell actuators 910 may expand or contract and cause support elements 946 to rotate about hinge 966. In one embodiment, unit-cell actuators 910 are coupled between adjacent segments, such as support elements 946, to cause the segments to fan in and out about hinge 966.

Figure 18:
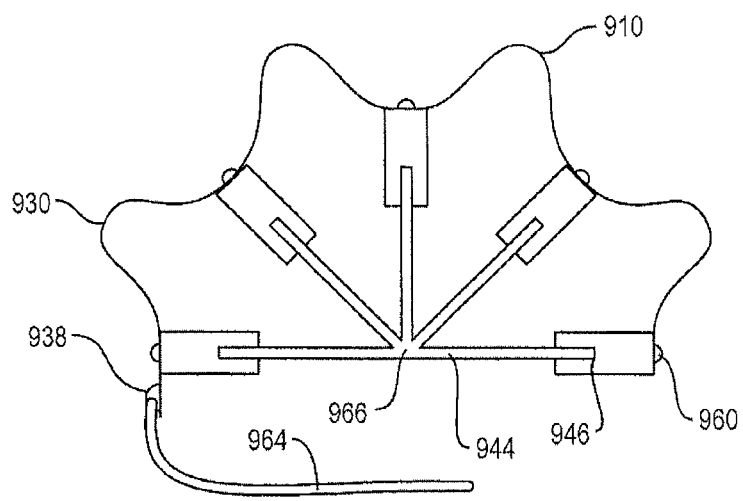
FIG. 18 is a side view of the actuator of FIG. 17.

FIG. 18 is a side view of actuator 900 of FIG. 17 and illustrates the symmetrical arrangement of support elements 946 and unit-cell actuators 910 about hinge 966. Unit-cell actuators 910 are coupled to support elements 946 such that sections of six unit-cell actuators each are aligned with coupling surfaces 947. Upon activation by a heat source, each flexible unit-cell actuator 910 may expand or contract. Support structure 944 guides the expansion or contraction of the unit-cell actuators 910 along a circular trajectory around hinge 966.

A prototype of a rotational actuator, such as actuator 900 shown in FIGS. 17 and 18, was built. The performance of the prototype actuator is comparable to commercial electromagnetic motor of approximately the same size. Table 1 compares the performance data of the prototype rotational actuator based on shape memory alloy sheet to the data of a motor of the series Micromo 1624 006S. For only a fraction of the weight (about 1/40th) the prototype rotational actuator can obtain 3.4 times the torque consuming 3.5 times more power.

TABLE 1

Comparison of a prototype Shape Memory Alloy (SMA) actuator to a commercial electromagnetic motor of series Micromo 1624 006S.

| | Electromagnetic Motor | SMA Rotational Actuator |
| --- | --- | --- |
| Torque | 1.5 mNm | 80 g * 6.5 mm * 9.8 m/s^2 = 5.096 mNm |
| Power Requirement | 1.7 W | 6 W |
| Weight | 21 g | 0.5 g |
| Diameter | 16 mm | 13 mm |

Figure 19:
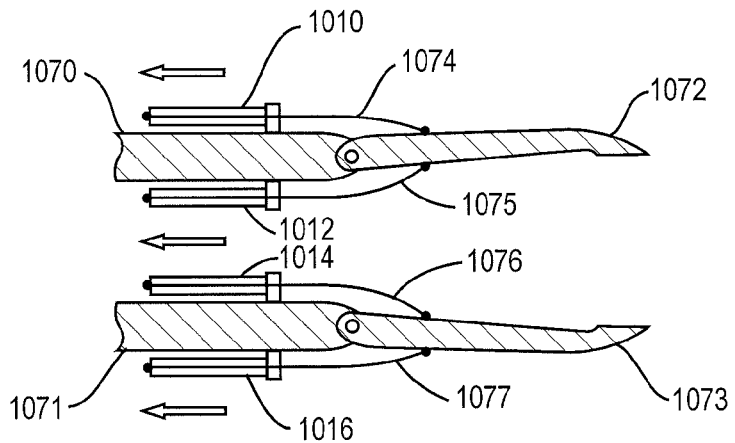
FIG. 19 illustrates the use of an embodiment of the invention in laparoscopic tweezers.

FIG. 19 illustrates the use of linear actuators in laparoscopic tweezers according to an embodiment of the present invention. Laparoscopic tweezer mechanism 1000 includes arms 1070 and 1071 and grippers 1072 and 1073. Each gripper 1072 and 1073 is rotatably coupled to one arm 1070 and 1071, respectively. A pair of actuators 1010 and 1012 is connected to arm 1070 and coupled to gripper 1072 by first and second connectors 1074 and 1075. Similarly, a pair of actuators 1014 and 1016 is connected to arm 1071 and coupled to gripper 1073 by first and second connectors 1076 and 1077. Actuators 1010, 1012, 1014, and 1016 may be flexible unit-cell actuators 10 as described with reference to FIG. 1B. Actuators 1010, 1012, 1014, and 1016 may include shape memory alloy actuators. Preferably, actuators 1010, 1012, 1014, and 1016 are linear actuators 800 as described above with reference to FIGS. 12-15. Each unit-cell actuator 1010, 1012, 1014, and 1016 is further configured to exert force in the direction indicated by arrows when activated. Of the pair of actuators attached to arm 1070, actuator 1010 is configured to exert force on connector or cable 1074, the other, 1012, to exert force on connector 1075. Connector 1074 in turn is configured to open gripper 1072 while connector 1075 is configured to close gripper 1072. Similarly, actuators 1014 and 1016 attached to arm 1071 are configured to exert force on connectors 1076 and 1077, respectively, to close or open gripper 1073. In some embodiments, only one gripper 1072 may be rotatably connected to arm 1070 and only one pair of actuators 1010 and 1012 may be employed. In addition, rotatable gripper 1072 may open and close against another gripper 1073 that is fixed or against another part of tweezer mechanism 1000. Furthermore, actuators 1010, 1012, 1014, and 1016 may be rotational actuators, such as actuator 900 described above with reference to FIGS. 17 and 18.

Figure 20A:
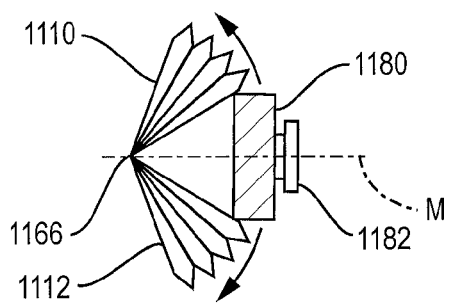
FIGS. 20A-B illustrate the use of an embodiment of the invention in orienting a micro-camera.
Figure 20B:
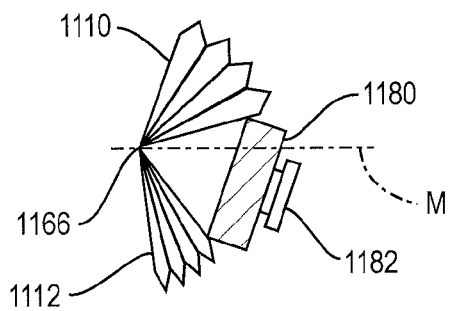

FIGS. 20A-B illustrate the use of rotational actuators in orienting an optical instrument or device according to embodiments of the present invention. Actuating mechanism 1100 includes one or more actuators 1110 and 1112 coupled to a support 1180 that holds an optical instrument 1182. Actuators 1110 and 1112 may include shape memory alloy actuators. Preferably, actuators 1110 and 1112 are rotational actuators, such as actuator 900 described above with reference to FIGS. 17 and 18. Activation of actuators 1110 and 1112 results in a displacement of support 1180 and optical instrument 1182 away from midline M. In one embodiment, a pair of actuators 1110 and 1112 may be connected to hinge 1166 and also connected to opposite ends of support 1180. In this way, activation of actuator 1110 connected to one end of support 1180 causes scanning movement of support 1180 and optical instrument 1182 in one direction, while activation of actuator 1112 causes scanning movement of support 1180 and optical instrument 1182 in the opposite direction, as indicated by arrows in FIG. 20A. Actuators 1110 and 1112 may cause the optical instrument to pan in a horizontal plane or tilt in a vertical plane. For example, activation of actuator 1110 may cause an expansion of actuator 1110, thereby causing the optical instrument to tilt away from midline M, as shown in FIG. 20B. Optical instrument 1182 may be a lens assembly or a micro-camera. Actuating mechanism 1100 need not include support 1180 and actuators 1110 and 1112 may be coupled to optical instrument 1182. In some embodiments, multiple pairs of actuators 1110 and 1112 may be connected to support 1180 or to optical instrument 1182 to allow actuation in multiple planes. For example, one pair of actuators 1110 and 1112 may actuate support 1180 in a horizontal plane, while another pair of actuators 1110 and 1112 may actuate support 1180 in a vertical plane. Furthermore, actuators 1110 and 1112 may be linear actuators, such as actuator 800 described above with reference to FIGS. 12 and 13. Optical instrument 1182 may rotate when actuated similar to rotable gripper 1072 of FIG. 19.

Figure 21:
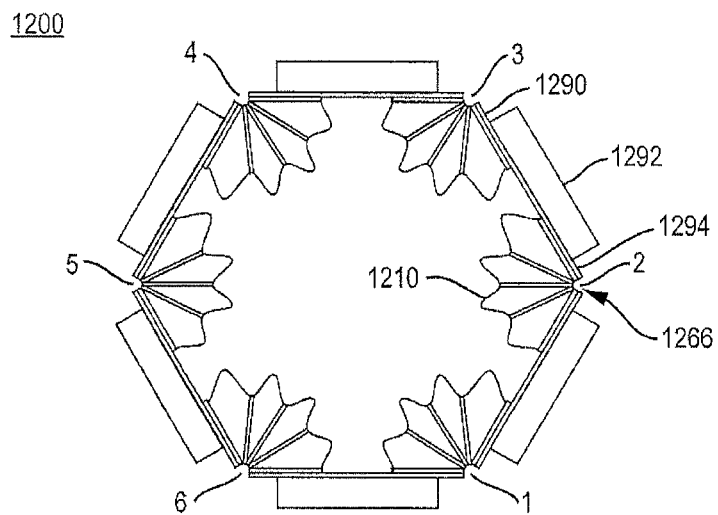
FIG. 21 is a side view of an example of an apparatus for rolling motion that includes six rotational actuators arranged in the corners of a hexagon.
Figure 22:
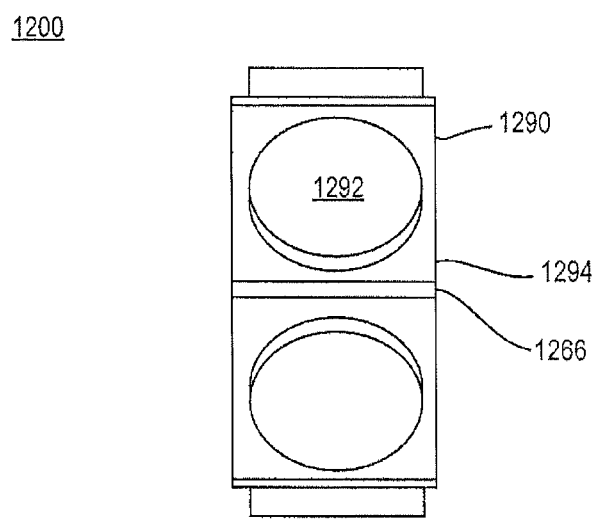
FIG. 22 is a frontal view of the apparatus of FIG. 21.

FIGS. 21 and 22 illustrate the use of rotational actuators in an apparatus for rolling motion according to an embodiment of the present invention. FIG. 21 is a side view of apparatus 1200 that includes six actuators 1210 arranged in corners 1-6 of hexagonal body 1290. Body 1290 is formed by six linear sections 1294. Adjacent sections 1294 may be coupled by a hinge 1266 located at a corner of body 1290. In general, apparatus 1200 may include multiple sections formed in a ring and actuators 1210 coupled between sections to deform the ring, thereby inducing a rolling motion of apparatus 1200. As shown in FIG. 21, each actuator 1210 may include an array of unit-cell actuators coupled to a fan-like support structure, such as actuator 900 described above with reference to FIGS. 17 and 18. Alternatively, each actuator 1210 may include a linear actuator, such as actuator 800 described above with reference to FIGS. 12 and 13. Actuators 1210 may include shape memory alloy actuators and need not include focused heating. Apparatus 1200 may further include weights 1292 attached to body 1290. Weights 1292 may be attached to the outside of body 1290 as shown in FIG. 21. In some embodiments, weights 1292 may be batteries that can function as voltage or current sources to activate actuators 1210. In the disclosed embodiment, one weight 1292 is attached to each of the six sections 1294 of body 1290. Typically, weights 1292 are attached to body 1290 such that weights 1296 are distributed evenly around the outside of apparatus 1200 and symmetrically about the center of body 1290. FIG. 22 is a frontal view of apparatus 1200 of FIG. 21 and further illustrates the location of weights 1292 on the outside of body 1290.

Figure 23A:
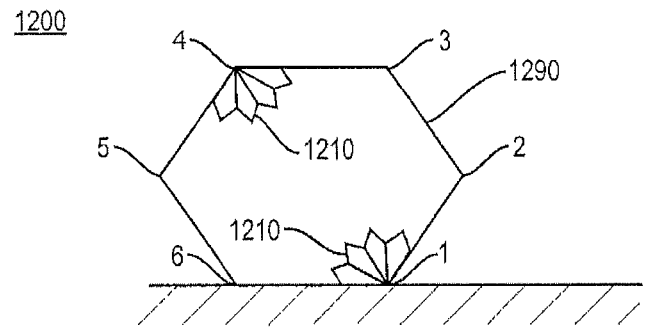
FIGS. 23A-D illustrate the rolling motion of the apparatus of FIG. 21.
Figure 23B:
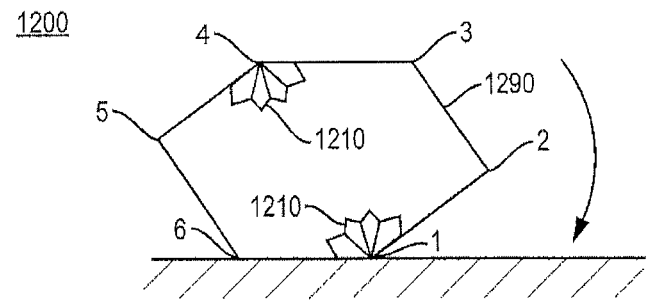
Figure 23C:
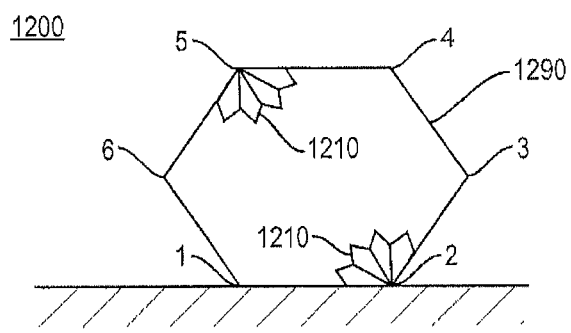
Figure 23D:
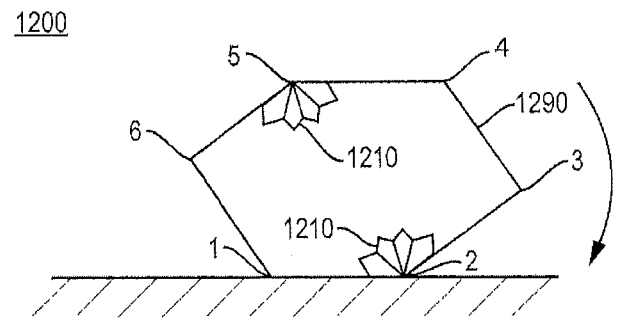

The operation of apparatus 1200 for rolling motion in accordance with an embodiment of the present invention is illustrated in FIGS. 23A-23D. For simplicity, weights 1292 are not shown. At the start, apparatus 1200 sits on one side of the hexagonal body 1290 as shown in FIG. 23A. For example, apparatus 1200 may sit on the side of the hexagonal body 1290 between corners 1 and 6. Apparatus 1200 can commence rolling motion by activating one of the actuators 1210 located at the bottom, i.e. in corners 1 or 6, and another actuator located directly opposite, i.e. corners 4 or 3, respectively. For simplicity, only two of the six actuators 1210 are shown in FIG. 23A. For example, actuator 1210 located in corner 1 of hexagonal body 1290 may be activated along with actuator 1210 located in corner 4, causing apparatus 1200 to flatten out as shown in FIG. 23B. As apparatus 1200 flattens out, weights 1292, FIG. 21, attached to the sides of apparatus 1200 provide inertial forces that pull apparatus 1200 in the direction of motion, indicated by the arrow in FIG. 23B. The side of apparatus 1200 initially in contact with the surface lifts off and the neighboring side located between corners 1 and 2 makes contact with the surface as shown in FIG. 23C. The rolling motion is sustained by sequentially activating pairs of actuators 1210. For example, actuators 1210 located in corners 2 and 5 of hexagonal body 1290 may be activated next, continuing the rolling motion as indicated in FIG. 23D. In a preferred embodiment, the sequence of activation of actuators 1210, as given by their location in the corners of hexagonal body 1290, may be: 1 and 4, 2 and 5, 3 and 6, 4 and 1, 5 and 2, and 6 and 3. This sequence presents one full rotation of apparatus 1200. In some embodiments, the timing of activation may be such that an actuator pair is activated when the corner of hexagonal body 1290 where one of the actuators of the pair is located makes contact with the surface. Pairs of actuators may be activated such that more than one pair is activated at a time. For example, the time and duration of activation of the pair of actuators 1210 located in corners 2 and 5, as shown in FIG. 23C, may overlap with the time and duration of activation of the pair of actuators 1210 located in corners 1 and 4, as shown in FIG. 23B.

This invention has been further developed as presented in the article, E. Torres-Jara, K. Gilpin, J. Karges, R. J. Wood, and D. Rus, "Composable Flexible Small Actuators Built From Thin Shape Memory Alloy Sheets," accepted for publication in IEEE Robotics and Automation Magazine, December 2010, being filed herewith, which describes further embodiments of the invention and which is incorporated herein by reference in its entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A flexible unit-cell actuator comprising:
a shape memory alloy sheet having a fold between adjacent legs in one state, the fold including a reduced cross-sectional area and slits to increase electrical resistance at the fold relative to the adjacent legs, the shape memory alloy sheet further having bends from the respective legs to coupling regions, each bend including slits to increase electrical resistance at each bend relative to the adjacent legs; and
a heat source that upon activation concentrates heating of the shape memory alloy sheet at the fold relative to the legs to change the fold between the one state and another state, the heat source comprising resistive heating due to an electrical current passing through the shape memory alloy sheet.

2. The unit-cell actuator of claim 1, wherein the fold forms approximately a 180 degrees bend in the shape memory alloy sheet in one of the states.

3. The unit-cell actuator of claim 1, wherein each of the bends forms approximately a 90 degrees bend in the shape memory alloy sheet in one of the states.

4. The unit-cell actuator of claim 3, wherein the unit-cell actuator expands by at least 10% when the heat source is activated.

5. The unit-cell actuator of claim 3, wherein the unit-cell actuator expands by at least 50% when the heat source is activated.

6. The unit-cell actuator of claim 3, wherein the shape memory alloy sheet comprises a shape memory alloy selected from the group consisting of NiTi, CuZnAl, and CuAlNi.

7. An actuator array comprising:
a plurality of flexible unit-cell actuators formed in a sheet, each unit-cell actuator comprising:
a shape memory alloy sheet having a fold between adjacent legs in one state and coupling regions; and
a heat source that upon activation concentrates heating of the shape memory alloy sheet at the fold relative to the legs to change the fold between the one state and another state,
each unit-cell actuator being mechanically coupled to at least one other unit-cell actuator at a coupling region.

8. The actuator array of claim 7, wherein each heat source comprises resistive heating due to an electrical current passing through each shape memory alloy sheet.

9. The actuator array of claim 8, wherein each fold includes a reduced cross sectional area to increase electrical resistance at the fold relative to the adjacent legs.

10. The actuator array of claim 9, wherein each fold further includes slits to increase electrical resistance at the fold relative to the adjacent legs.

11. The actuator array of claim 10, wherein each shape memory alloy sheet further has bends from the respective legs to the coupling regions, each bend including slits to increase electrical resistance at each bend relative to the adjacent legs.

12. The actuator array of claim 9, wherein plural unit-cell actuators are mechanically coupled in series and multiple such series are mechanically coupled in parallel.

13. The actuator array of claim 12, wherein plural unit-cell actuators are electrically connected in series.

14. An actuator comprising:
a support structure having support elements; and
a plurality of flexible unit-cell actuators formed in a sheet and mechanically coupled to the support structure, each unit-cell actuator comprising:
a shape memory alloy sheet having a fold between adjacent legs in one state and coupling regions; and
a heat source that upon activation concentrates heating of the shape memory alloy sheet at the fold relative to the legs to change the fold between the one state and another state,
each unit-cell actuator being mechanically coupled to at least one other unit-cell actuator at a coupling region.

15. The actuator of claim 14, wherein each heat source comprises resistive heating due to an electrical current passing through each shape memory alloy sheet.

16. The actuator of claim 15, wherein each fold includes a reduced cross sectional area to increase electrical resistance at the fold relative to the adjacent legs.

17. The actuator of claim 16, wherein each fold includes slits to increase electrical resistance at the fold relative to the adjacent legs.

18. The actuator of claim 16, wherein each shape memory alloy sheet further has bends from the respective legs to the coupling regions, each bend including slits to increase electrical resistance at each bend relative to the adjacent legs.

19. The actuator of claim 16, wherein plural unit-cell actuators are mechanically coupled in series and multiple such series are mechanically coupled in parallel.

20. The actuator of claim 19, wherein plural unit-cell actuators are electrically connected in series.

21. The actuator of claim 16, wherein each flexible unit-cell actuator is mechanically coupled to one of the support elements at each coupling region.

22. The actuator of claim 21, wherein the unit-cell actuators are arranged in a symmetrical pattern about an axis.

23. The actuator of claim 21, wherein at least one of the support elements moves along a curve when actuated by at least one of the unit-cell actuators.

24. The actuator of claim 21, wherein at least one of the support elements rotates about an axis when actuated by at least one of the unit-cell actuators.

25. The actuator of claim 21, wherein plural unit-cell actuators move along a defined surface.

26. The actuator of claim 14, further including a guide, the support elements slidable along the guide, the unit-cell actuators being coupled between adjacent support elements and circumferentially about the support elements.

27. The actuator of claim 14, wherein the support elements fan from a hinge, the unit-cell actuators being coupled between adjacent support elements to cause the support elements to fan in and out about the hinge.

28. The actuator of claim 14, wherein the support elements form a surface, the unit-cell actuators being coupled to the support elements to articulate the surface.

29. A method of operating actuators, the method comprising the steps of:
providing a plurality of mechanically coupled actuators that follow a defined motion, each actuator comprising:
a support structure having support elements; and
a plurality of flexible unit-cell actuators formed in a sheet and mechanically coupled to the support structure, each unit-cell actuator comprising:
a shape memory alloy sheet having a fold between adjacent legs in one state and coupling regions; and a heat source that upon activation concentrates heating of the shape memory alloy sheet at the fold relative to the legs to change the fold between the one state and another state, each unit-cell actuator being mechanically coupled to at least one other unit-cell actuator at a coupling region; and activating the heat sources of the unit-cell actuators to cause the unit-cell actuators to follow the defined motion.

30. The method of claim 29, wherein the motion is along a curve.

31. The method of claim 30, wherein the motion is along a surface.

32. A linear or curvilinear actuator comprising:

a guide;

a plurality of bearings slidable along the guide; and an array of actuators coupled between adjacent bearings and circumferentially about the bearings, each actuator comprising a shape memory alloy sheet having a fold between adjacent legs, the legs joined at coupling regions to the bearings.

33. The actuator of claim 32, wherein the guide is a straight rod.

34. The actuator of claim 32, wherein the actuator drives a gripper.

35. An actuator comprising:

a plurality of segments fanning from a hinge; and shape memory alloy actuators coupled between adjacent segments to cause the segments to fan in and out about the hinge, each of the actuators including a shape memory alloy sheet having a fold between adjacent legs in one state.

36. The actuator of claim 35, wherein the actuators include an array of parallel actuators coupled between adjacent segments.

37. The actuator of claim 35, wherein the actuator drives an optical device coupled between adjacent segments to cause the optical device to scan.

* * * * *